(12) United States Patent
Cox et al.

(10) Patent No.: US 11,291,896 B1
(45) Date of Patent: Apr. 5, 2022

(54) HAND POSITIONING ACCESSORY

(71) Applicant: Firsty Athlete Company, Mountain City, TN (US)

(72) Inventors: Hailey M. Cox, Mountain City, TN (US); Timothy A. Cox, Jr., Mountain City, TN (US)

(73) Assignee: FIRSTY ATHLETE COMPANY, Mountain City, TN (US)

( * ) Notice: Subject to any disclaimer, the term of this patent is extended or adjusted under 35 U.S.C. 154(b) by 12 days.

(21) Appl. No.: 16/914,583

(22) Filed: Jun. 29, 2020

Related U.S. Application Data

(60) Provisional application No. 62/880,376, filed on Jul. 30, 2019, provisional application No. 62/868,539, filed on Jun. 28, 2019.

(51) Int. Cl.

| | |
|---|---|
| *A63B 60/10* | (2015.01) |
| *A63B 59/50* | (2015.01) |
| *A63B 60/14* | (2015.01) |
| *A63B 60/54* | (2015.01) |
| *A63B 69/00* | (2006.01) |
| *A63B 60/08* | (2015.01) |
| *B62K 21/26* | (2006.01) |
| *A63B 53/14* | (2015.01) |
| *A63B 102/18* | (2015.01) |

(52) U.S. Cl.
CPC .............. *A63B 60/10* (2015.10); *A63B 59/50* (2015.10); *A63B 60/08* (2015.10); *A63B 60/14* (2015.10); *A63B 60/54* (2015.10); *A63B 69/0002* (2013.01); *A63B 53/14* (2013.01); *A63B 2069/0008* (2013.01); *A63B 2102/18* (2015.10); *B62K 21/26* (2013.01)

(58) Field of Classification Search
CPC ......... A63B 57/50; A63B 59/58; A63B 53/14; A63B 60/10
See application file for complete search history.

(56) References Cited

U.S. PATENT DOCUMENTS

| | | | | |
|---|---|---|---|---|
| 3,433,481 | A * | 3/1969 | Tanguay | A63B 60/08 473/568 |
| 4,941,232 | A * | 7/1990 | Decker | B25F 5/026 473/301 |
| 5,704,845 | A * | 1/1998 | Boyte | A63B 21/4019 473/205 |
| 5,762,563 | A * | 6/1998 | Holzhausen | A63B 53/14 434/252 |
| 5,839,983 | A * | 11/1998 | Kramer | A63B 60/10 473/568 |
| 7,351,167 | B1 * | 4/2008 | Hathaway | A63B 60/10 473/568 |

(Continued)

*Primary Examiner* — Eugene L Kim
*Assistant Examiner* — Christopher Glenn
(74) *Attorney, Agent, or Firm* — Shane Cortesi

(57) ABSTRACT

Hand positioning accessories for bats and other sporting goods are described. The hand positioning accessory may include an exterior surface that is at least partially concave in shape and comprises a base comprising an apex and an interior surface that is at least partially convex in shape and faces the handle of the sporting good. The exterior surface may also include a plurality of longitudinal ribs/protrusions. The hand positioning accessory may create an ovular-shaped handle region for better performance.

24 Claims, 31 Drawing Sheets

(56) References Cited

U.S. PATENT DOCUMENTS

| | | | | |
|---|---|---|---|---|
| 8,801,551 B2* | 8/2014 | Leinert | .................. | A63B 59/52 |
| | | | | 473/568 |
| 10,046,215 B2 | 8/2018 | Eastman | | |
| 10,912,972 B1* | 2/2021 | Fortin | .................... | A63B 60/14 |
| 2004/0180739 A1* | 9/2004 | Kramer | .................. | A63B 60/54 |
| | | | | 473/568 |
| 2005/0202910 A1* | 9/2005 | Blount | .................. | A63B 60/12 |
| | | | | 473/568 |
| 2007/0082750 A1* | 4/2007 | Rose | ...................... | A63B 60/14 |
| | | | | 473/300 |
| 2008/0066504 A1* | 3/2008 | Matsushita | ............ | B65D 63/10 |
| | | | | 70/58 |
| 2013/0090183 A1* | 4/2013 | Hachiro | .................. | A63B 60/16 |
| | | | | 264/250 |
| 2013/0130844 A1* | 5/2013 | Wagner | ............. | A63B 69/0002 |
| | | | | 473/422 |
| 2014/0349783 A1* | 11/2014 | Haley | .................... | A63B 57/50 |
| | | | | 473/406 |
| 2015/0367210 A1* | 12/2015 | Long | ...................... | A63B 59/50 |
| | | | | 473/568 |
| 2016/0193512 A1* | 7/2016 | Wills | ...................... | A63B 57/20 |
| | | | | 29/434 |
| 2017/0028278 A1* | 2/2017 | Mueller | ................. | A63B 53/14 |
| 2017/0239541 A1* | 8/2017 | Eastman | ................ | A63B 53/14 |

* cited by examiner

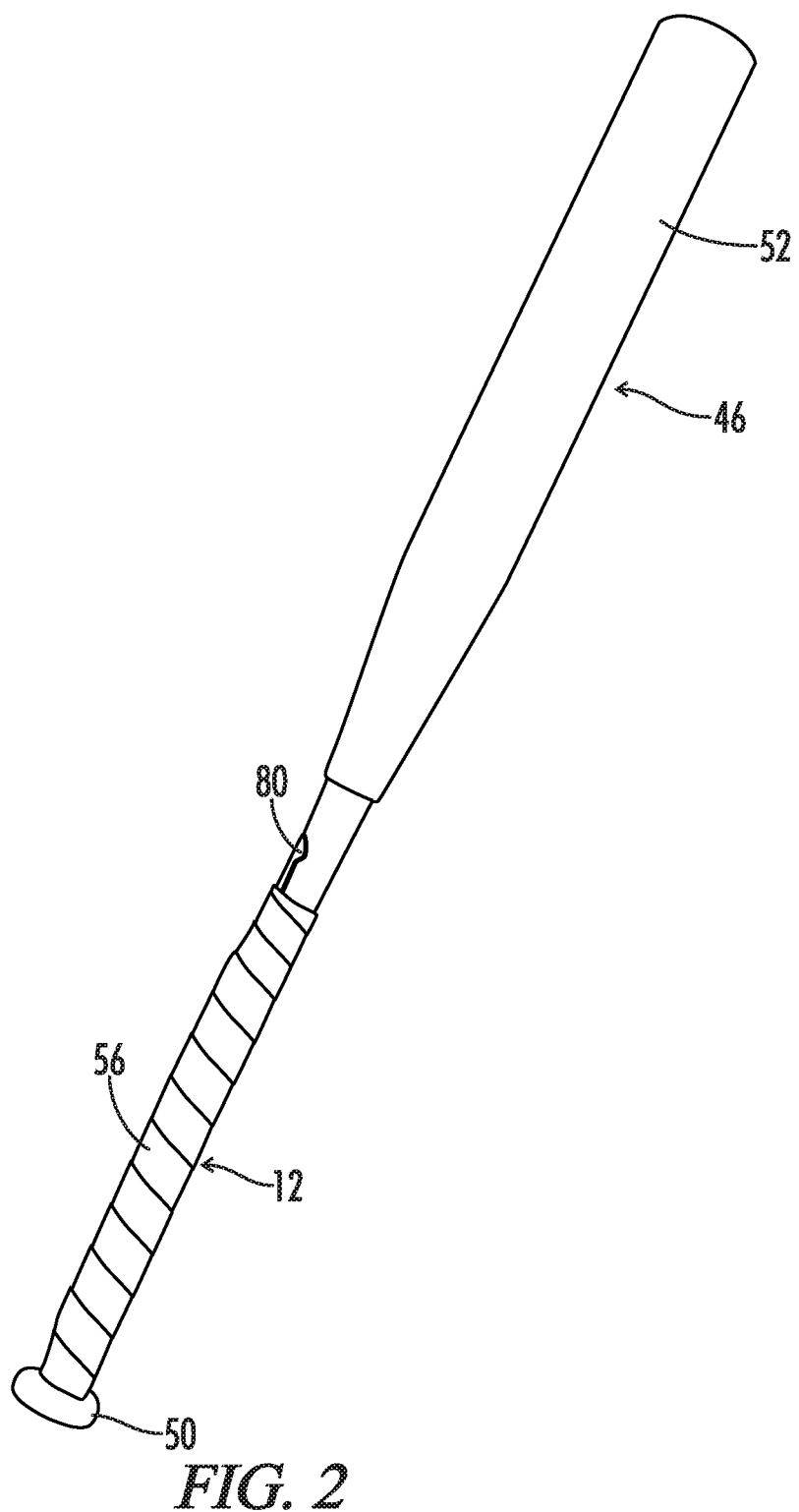
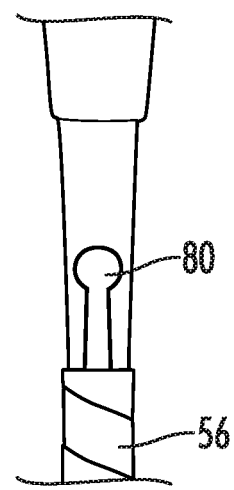
FIG. 2
FIG. 3

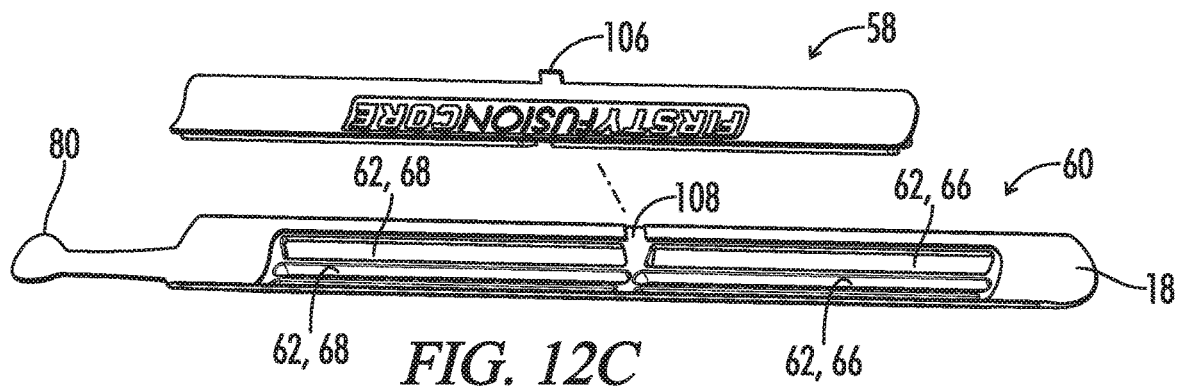
FIG. 12C
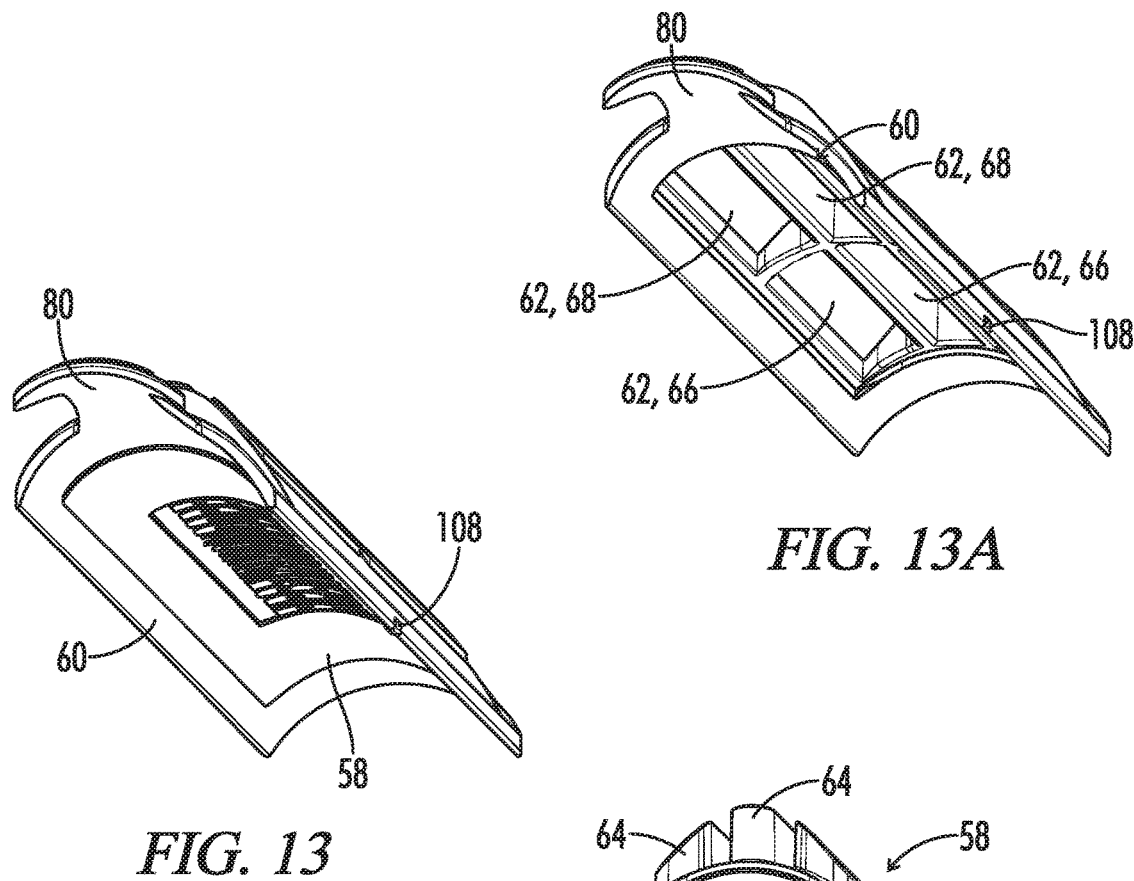
FIG. 13
FIG. 13A
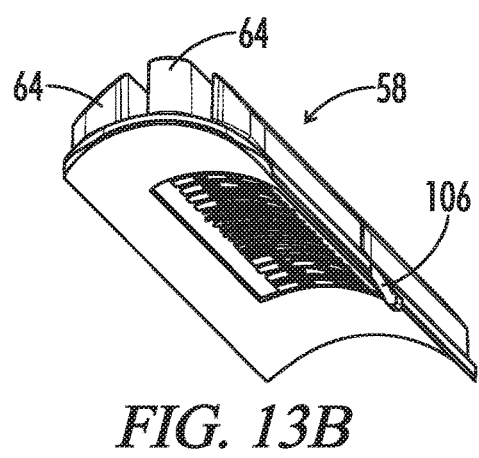
FIG. 13B

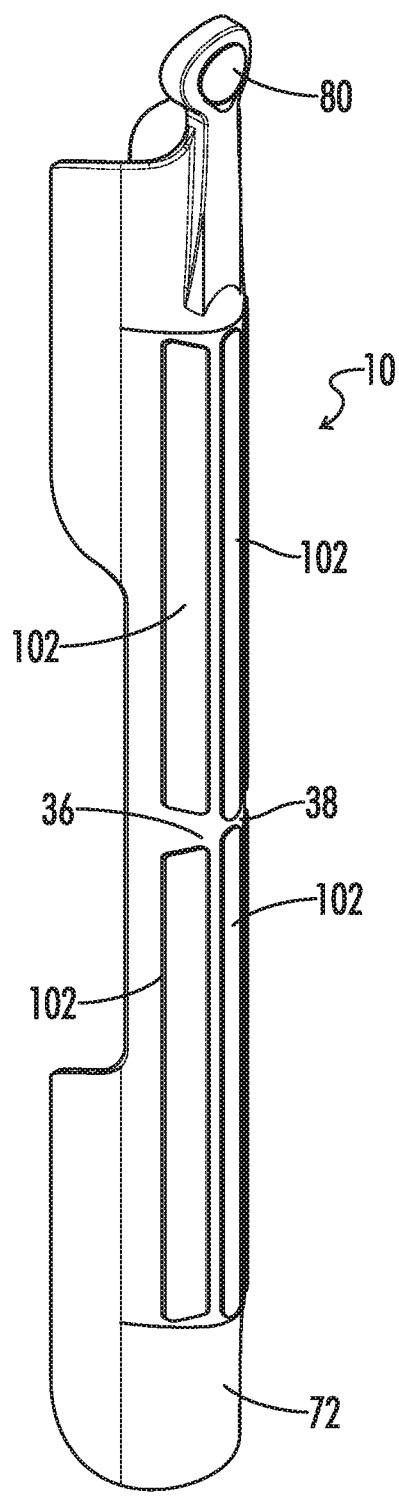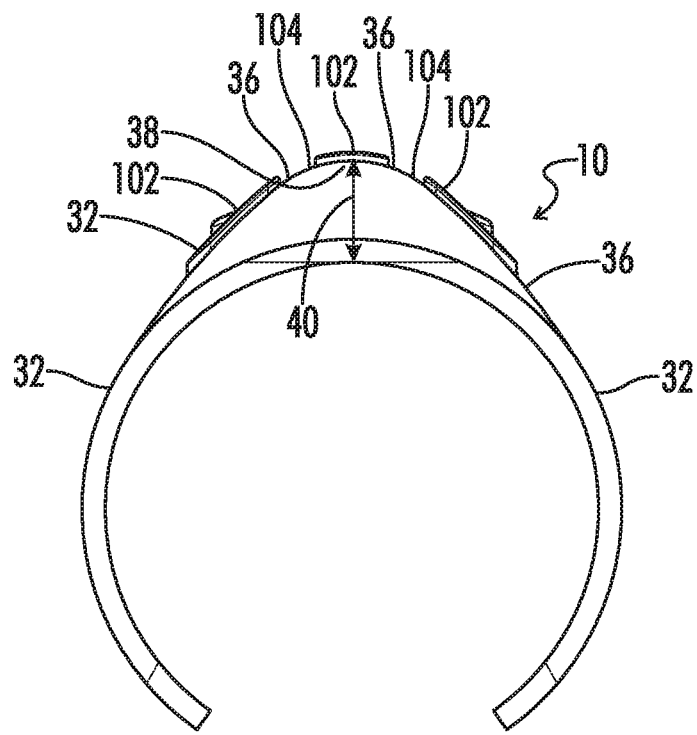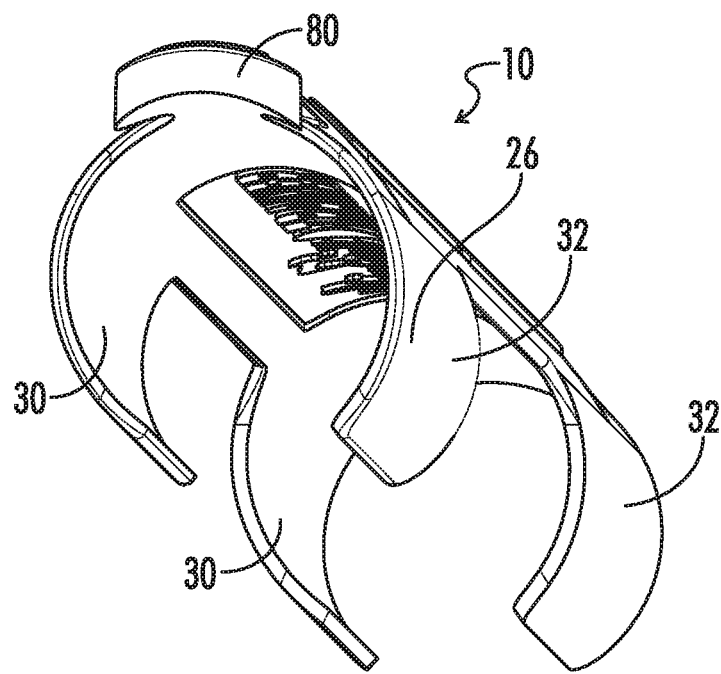
FIG. 22
FIG. 23
FIG. 23A

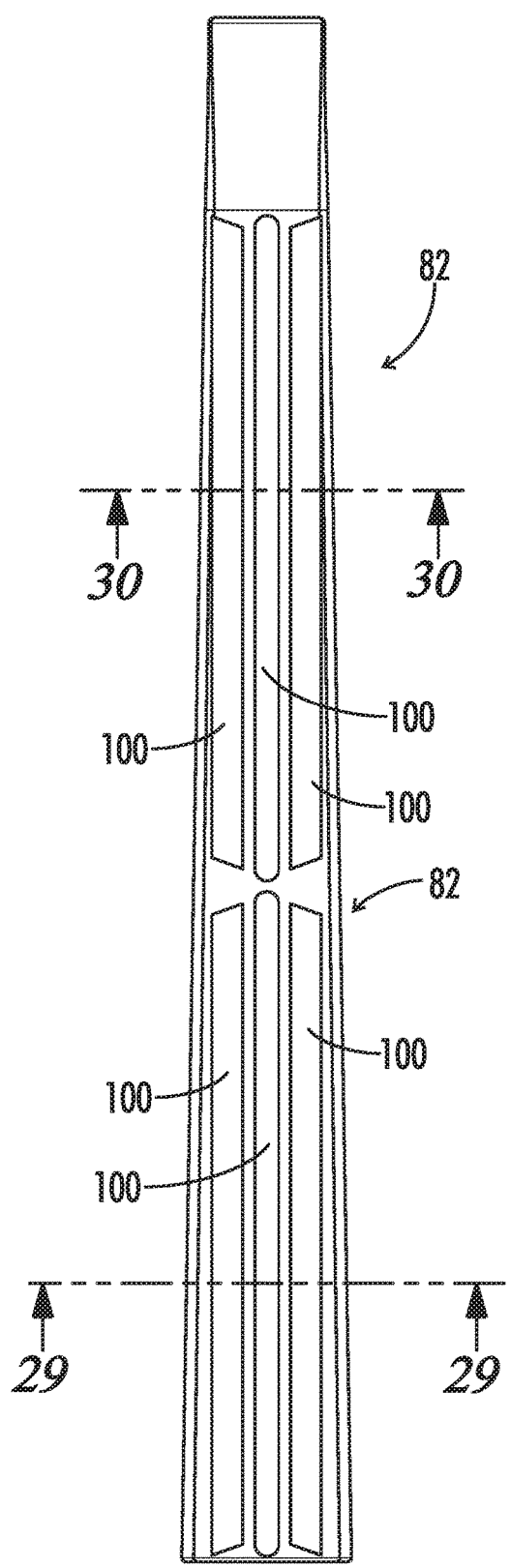
FIG. 28
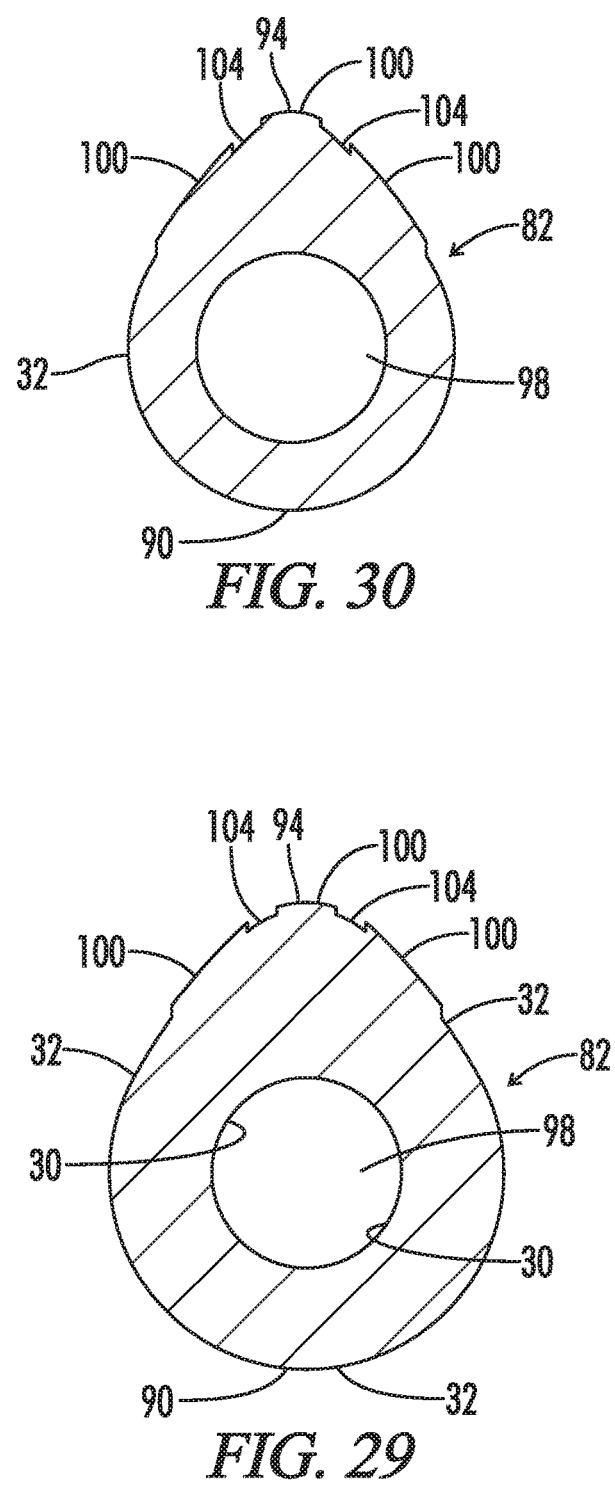
FIG. 30
FIG. 29

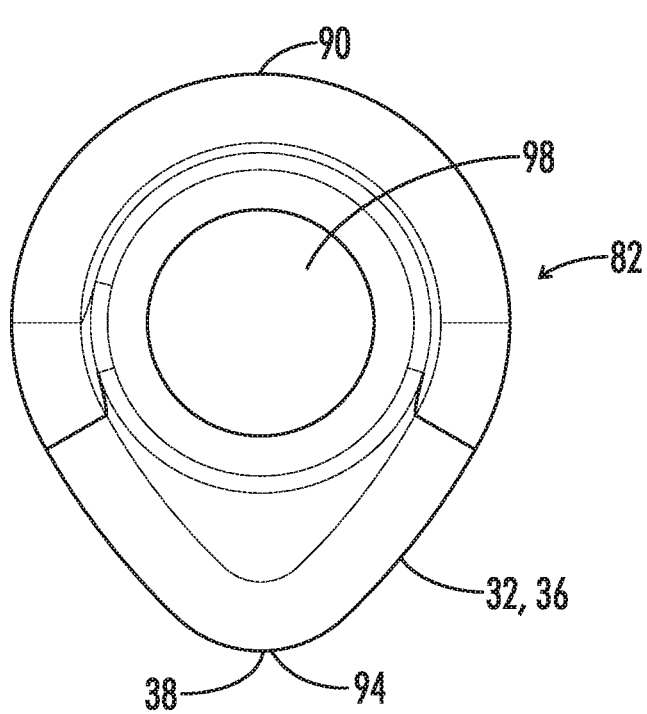
FIG. 36
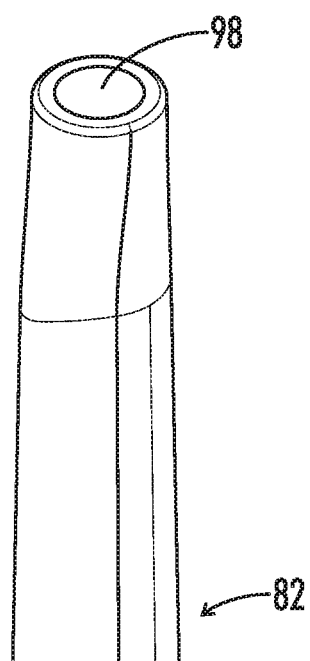
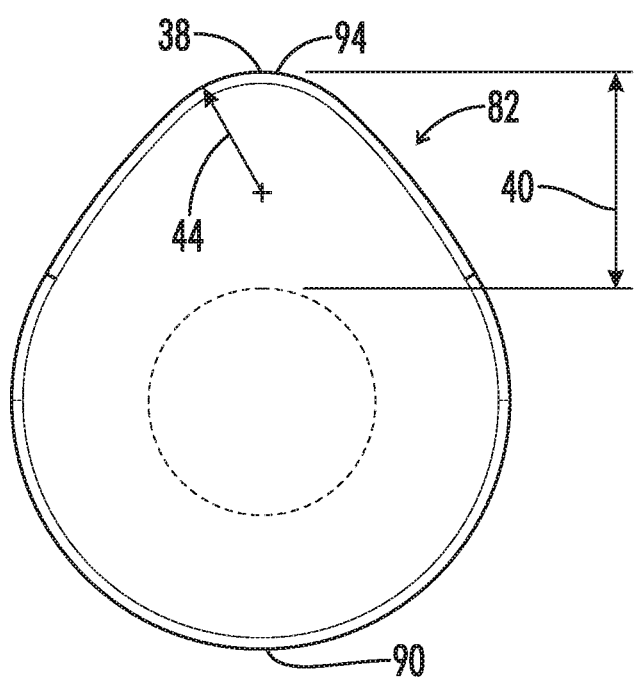
FIG. 37
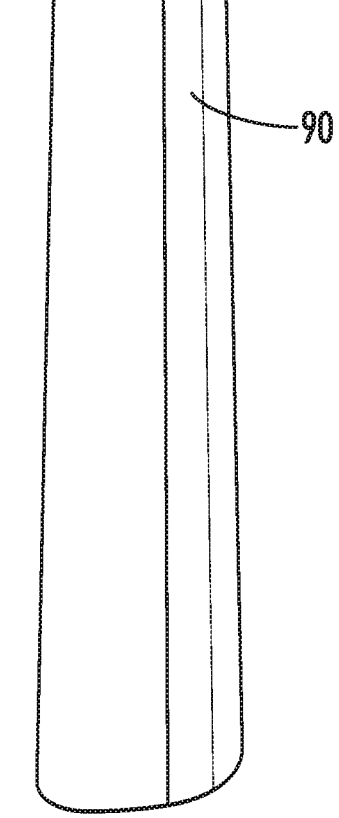
FIG. 38

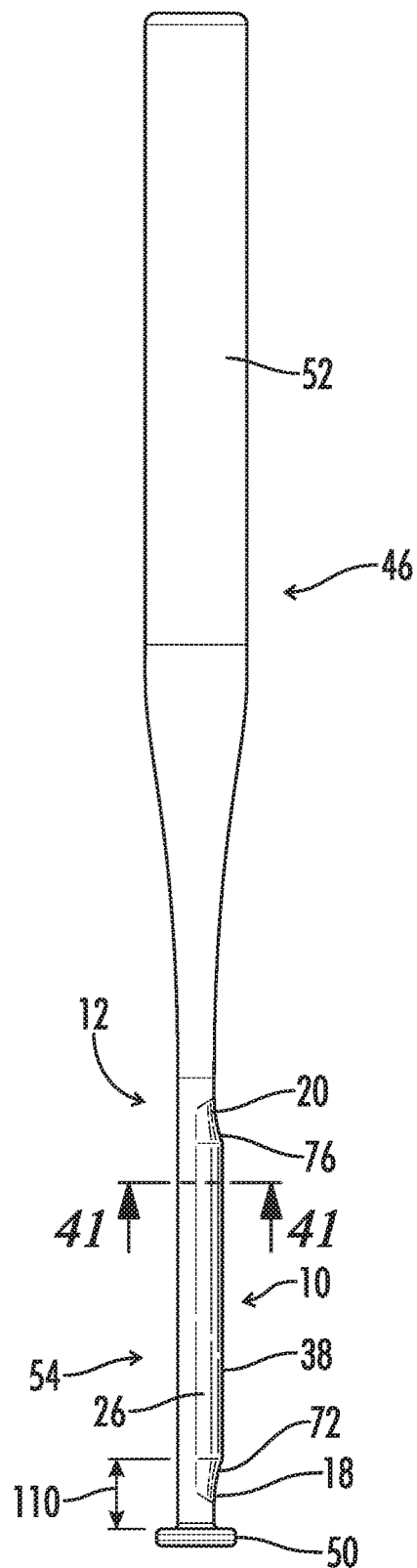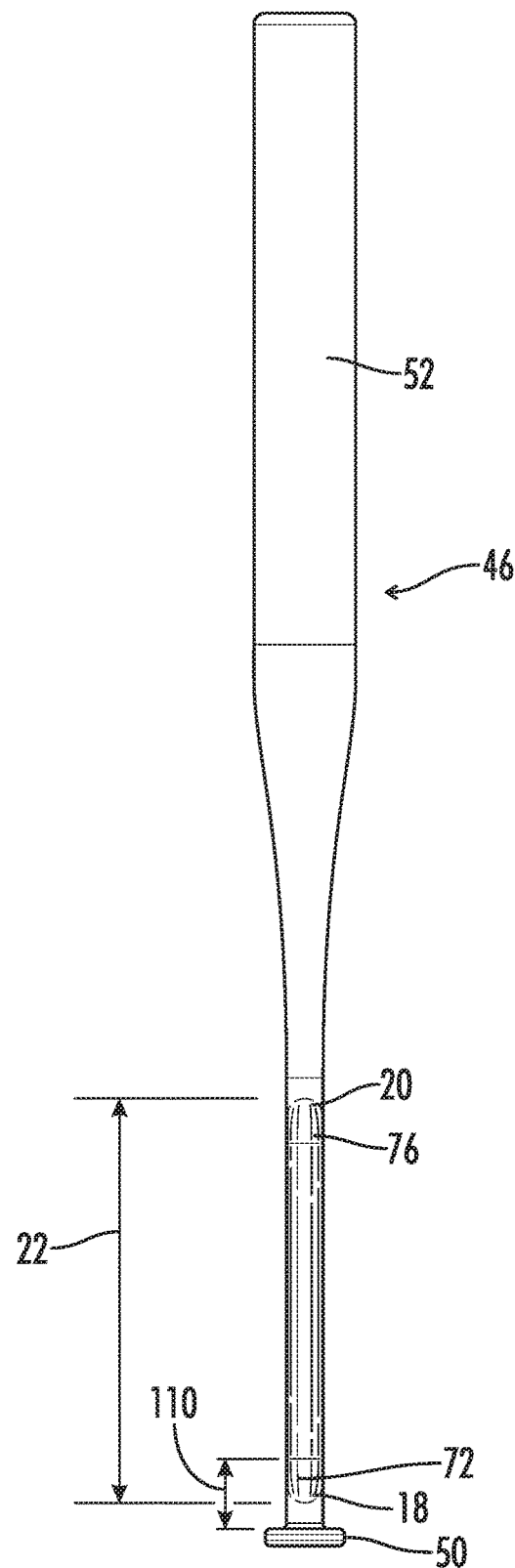
*FIG. 39*   *FIG. 40*

HAND POSITIONING ACCESSORY

RELATED APPLICATIONS

This application claims priority under 35 U.S.C 119 to U.S. Patent Application Nos. 62/868,539, filed Jun. 28, 2019 and 62/880,376, filed Jul. 30, 2019, the contents of which are incorporated by reference in their entireties.

TECHNICAL FIELD

The present application relates to sporting goods, more particularly to an accessory that informs users how to position their hands on sporting equipment such as golf clubs, bats and bicycles.

BACKGROUND OF THE INVENTION

Incorrect hand positioning is a common problem in both golf and baseball. U.S. Pat. No. 8,801,551 teaches baseball bats with handles that include non-circular cross-sections. However, among other problems, the handle is permanently incorporated into the baseball bat, whereas different players desire baseball bats from different manufacturers. Moreover, the handle does not cushion vibration from the bat.

Thus, there is a continuing need for handle positioning accessories that inform users how to position their hands on sporting equipment such as golf clubs and bats.

BRIEF SUMMARY

The present disclosure relates to hand positioning accessories as described herein.

In some embodiments, the present disclosure provides a method of using a sporting good comprising the steps of: a) providing a sporting good that may include a handle region configured to be grasped by a hand of a human user, the handle region comprising a shaft and a hand positioning accessory at least partially surrounding the shaft, the hand positioning accessory having a proximal end, a distal end, a length extending from the proximal end to the distal end, a left side, a right side, a width extending from the left side to the right side and generally perpendicular to the length, an interior surface facing the shaft, an exterior surface opposite the interior surface, configured to receive a plurality of fingers of the human user and comprising a base comprising an apex, and a thickness extending from the interior surface to the exterior surface and generally perpendicular to the length and width. Optionally, at least a portion of the base is generally convex in shape and at least a portion of the interior surface of the hand positioning accessory is generally concave in shape. Optionally, the hand positioning accessory further comprises a recess/hollow interior located interiorly relative to the interior surface, receiving the shaft and extending from the left side to the right side. Optionally, the apex is curved and the apex has a radius of curvature of between about 0.15 inches to about 0.4 inches (excluding any narrowly profiled regions of the apex). Optionally, the thickness of the hand positioning accessory at the apex, as measured from the interior surface to the apex is between about 0.1 to about 0.5 inches (excluding any narrowly profiled regions of the apex). Optionally, the method further includes: b) wrapping at least some fingers of the human user around the hand positioning accessory; and c) using the human user's hand to move the sporting good.

Optionally, step c) comprises swinging the sporting good. Optionally, the hand positioning accessory only extends partially around the shaft. Optionally, the entire base is generally convex in shape wherein the entire interior surface is generally concave in shape and further wherein the entire hand positioning accessory is generally in the shape of an arch. Optionally, the shaft is generally cylindrical in shape or at least radiused. Optionally, the sporting good is selected from the group consisting of a bat, golf club, barbell, dumbbell, or lacrosse stick. Optionally, the sporting good is a bat that further comprises a knob located proximal to the hand positioning accessory proximal end and a barrel located distal to the hand positioning accessory distal end, and further wherein the shaft is the handle of the bat. Optionally, the hand positioning accessory is attached to the handle by a grip wrap/grip tape, and further wherein the grip wrap/grip tape is positioned between the user's fingers and the hand positioning accessory in steps b) and c). Optionally, the hand positioning accessory is removably attached to the shaft. Optionally, the apex extends longitudinally generally parallel to the length for a distance of at least 5 inches. Optionally, the hand positioning accessory is generally semi-cylindrical in shape with a hollow interior. Optionally, the shaft is generally cylindrical in shape and has a diameter of between about 0.7 inches and about 1 inch. Optionally, the recess/hollow interior extends substantially the entire length of the hand positioning accessory. Optionally, the hand positioning accessory is comprised of a soft core configured to absorb vibration from the shaft and a covering partially covering the core and having a hardness greater than the soft core, the covering forming the base. Optionally, the soft core has a hardness of from about 30 to about 70 (Shore A) and the covering has a hardness of from about 70 to about 125 (Shore A). Optionally, the soft core and covering each form a portion of the interior surface and the exterior surface. Optionally, the covering comprises a plurality of longitudinal slots and further wherein the soft core comprises a plurality of longitudinal ribs/protrusions protruding through the longitudinal slots beyond the base to form a portion of the exterior surface. Optionally, the plurality of longitudinal slots comprises a proximal group of three longitudinal slots and a distal group of three longitudinal slots. Optionally, step b) further comprises placing portions of a plurality of the user's fingers over portions of the longitudinal ribs/protrusions protruding through the longitudinal slots. Optionally, step b) further comprises placing pads of a plurality of the user's fingers over portions of the longitudinal ribs/protrusions protruding through the longitudinal slots. Optionally, the longitudinal ribs/protrusions protrude through the longitudinal slots a distance from about 0.05 inches to about 0.25 inches. Optionally, at least some of the longitudinal slots are generally rectangular in shape. Optionally, the longitudinal slots are approximately the same size. Optionally, the longitudinal slots are spaced approximately equally along the width. Optionally, the soft core is compressible by the user's fingers and the covering is not compressible by the user's fingers (luring ordinary use of the hand gripping accessory. Optionally, the covering and the soft core are comprised of a co-polymer or silicone. Optionally the soft core is comprised of thermoplastic polyurethane. Optionally, the covering is comprised of plastic. Optionally, the covering comprises a tab slot and the soft core comprises a tab positioned in the tab slot, and the tab slot and tab are located between the proximal and distal ends of the hand positioning accessory. Optionally, the tab slot and tab are located approximately in the center of the hand positioning accessory length. Optionally, the hand positioning accessory comprises a proximal tapered region adjacent to the proximal end in which the thickness increases distally.

Optionally, step b) further comprises placing a pinky finger of the human user over the proximal tapered region. Optionally, the hand positioning accessory comprises a distal tapered region adjacent to the distal end in which the thickness decreases distally. Optionally, the proximal end and distal end are curved. Optionally, the hand positioning accessory further comprises a tab extending distally from the distal end. Optionally, the sporting good is a metal or wooden bat. Optionally, the sporting good is approved for use in competition—e.g., cleared for use by USGA, USSSA and ASA, (USABat), NCAA and NFHS. Optionally, the sporting good is a golf club, wherein the hand positioning accessory forms a grip of the golf club, wherein the golf club further comprises a golf club head located at a distal end of the shaft. Optionally, the golf club head comprises a plurality of grooves. Optionally, the golf club is a wood (e.g., driver or fairway wood), an iron or a putter. Optionally, the grip and shaft each comprise a front side and an underside opposite the front side, wherein the head extends forwardly from the shaft distal end and further wherein the apex is located on the underside of the grip. Optionally, the grip is generally in the shape of a tear-drop. Optionally, the apex is located approximately in the center of the hand positioning accessory width.

In still further embodiments, the present disclosure provides a method of adding a hand positioning accessory to a bat comprising the steps of: a) providing a bat that may comprise a knob, a handle located above the knob and a barrel located above the handle; b) providing a hand positioning accessory that may have a proximal end, a distal end, a length extending from the proximal end to the distal end, a left side, a right side, a width extending from the left side to the right side and generally perpendicular to the length, an interior surface configured to face the handle, an exterior surface opposite the interior surface, configured to receive a plurality of fingers of a human user and comprising a base comprising an apex, and a thickness extending from the interior surface to the exterior surface and generally perpendicular to the length and width. Optionally, at least a portion of the base is generally convex in shape. Optionally, at least a portion of the interior surface of the hand positioning accessory is generally concave in shape. Optionally, the hand positioning accessory further comprises a recess/hollow interior located interiorly relative to the interior surface and extending from the left side to the right side. Optionally, the method further comprises: c) placing the handle in the recess/hollow interior so that the interior surface faces the handle. Optionally, the method further comprises: d) directly or indirectly attaching the hand positioning accessory to the handle. Optionally, the hand positioning accessory only extends around partially around the handle. Optionally, the entire base is generally convex in shape and the entire interior surface of the hand positioning accessory is generally concave in shape and further wherein the entire hand positioning accessory is generally in the shape of an arch. Optionally, the apex is curved and has a radius of curvature of between about 0.15 inches to about 0.4 inches. Optionally, the apex extends longitudinally generally parallel to the length for a distance of at least 5 inches. Optionally, the hand positioning accessory is generally semi-cylindrical in shape with a hollow interior. Optionally, after step d), the proximal end is adjacent to the knob. Optionally, the recess/hollow interior is configured to receive a generally cylindrical handle having a diameter of between about 0.7 and about 1 inch. Optionally, the handle is generally cylindrical in shape. Optionally, the recess/hollow interior extends substantially the entire length of the hand positioning accessory. Optionally, the thickness of the hand positioning accessory at the apex is between about 0.1 to about 0.5 inches. Optionally, the hand positioning accessory is comprised of a soft core configured to absorb vibration from the handle and a covering partially covering the core and having a hardness greater than the soft core, the covering forming the base. Optionally, the soft core has a hardness of from about 30 to about 70 (Shore A) and the covering has a hardness of from about 70 to about 125 (Shore A). Optionally, the soft core and covering each form a portion of the interior surface and the exterior surface. Optionally, the covering comprises a plurality of longitudinal slots and further wherein the core comprises a plurality of longitudinal ribs/protrusions protruding through the longitudinal slots beyond the base to form a portion of the exterior surface. Optionally, the plurality of longitudinal slots comprises a proximal group of three longitudinal slots and a distal group of three longitudinal slots. Optionally, the method further comprises the step of placing a plurality of a user's fingers over portions of the core protruding through the longitudinal slots. Optionally, the method further comprises the step of placing a plurality of pads of a user's fingers over portions of the core protruding through the longitudinal slots. Optionally, the longitudinal ribs/protrusions of the core protrude through the longitudinal slots from about 0.05 inches to about 0.25 inches. Optionally, at least some of the longitudinal slots are generally rectangular in shape. Optionally, the soft core is compressible by the user's fingers and the covering is not compressible by the user's fingers during ordinary use of the hand gripping accessory. Optionally, the longitudinal slots are also spaced approximately equally along the width. Optionally, the longitudinal slots are approximately the same size. Optionally, the covering and the soft core are comprised of co-polymer or silicone. Optionally, the soft core is comprised of thermoplastic polyurethane. Optionally, the covering is comprised of plastic. Optionally, step d) comprises using an adhesive to attach the interior surface of the hand positioning accessory to the handle. Optionally, step c) comprises positioning the proximal end adjacent to the knob. Optionally, after step d), the hand positioning accessory comprises a proximal tapered region adjacent to the proximal end in which the thickness increases distally. Optionally, the method further comprises placing a pinky finger of a human user over the proximal tapered region. Optionally, after step d), the hand positioning accessory comprises a distal tapered region adjacent to the distal end in which the thickness decreases distally. Optionally, step d) comprises wrapping a grip wrap/grip tape over the exterior surface to attach the handle gripping accessory to the handle. Optionally, step d) comprises attaching the handle accessory to a grip wrap/grip tape attached to the handle. Optionally, the proximal end is curved. Optionally, the hand positioning accessory further comprises a tab extending distally from the distal end. Optionally, the bat is metal. Optionally, the bat is wooden. Optionally, the sporting good is a regulation product cleared for use by a regulatory body.

In still further embodiments, the present disclosure provides a method of using a sporting good that may comprise the steps of: a) providing a sporting good that may comprise a handle region configured to be grasped by a hand of a human user, the handle region comprising a hand positioning accessory having a proximal end, a distal end, a length extending from the proximal end to the distal end, a left side, a right side, a width extending from the left side to the right side and generally perpendicular to the length, an exterior surface configured to receive a plurality of fingers of the human user and comprising a base comprising an apex.

Optionally, at least a portion of the base is generally convex in shape. Optionally, the apex is curved and the apex has a radius of curvature of between about 0.15 inches to about 0.4 inches (excluding any narrowly profiled regions of the apex). Optionally, the thickness of the hand positioning accessory at the apex, as measured from the interior surface to the apex is between about 0.1 inches and about 0.5 inches (excluding any narrowly profiled regions of the apex). Optionally, the method further comprises b) wrapping at least some fingers of the human user around the hand positioning accessory. Optionally, the method further comprises c) using the human user's hand to move the sporting good. Optionally, step c) comprises swinging the sporting good. Optionally, the sporting good is selected from the group consisting of a bat, a golf club, barbell, dumbbell, or a lacrosse stick. Optionally, the sporting good is a bat that further comprises a knob located proximal to the hand positioning accessory proximal end and a barrel located distal to the hand positioning accessory distal end, and further wherein the shaft is the handle of the bat. Optionally, the distance from the apex (excluding any narrowly profiled regions of the apex) to the knob is between about 0.5 inches to about 2.5 inches. Optionally, the hand positioning accessory comprises a proximal tapered region. Optionally, step b) further comprises placing a pinky finger of the human user over the proximal tapered region. Optionally, the hand positioning accessory is covered by grip wrap/grip tape. Optionally, the grip wrap/grip tape is positioned between the user's fingers and the hand positioning accessory in steps b) and c). Optionally, the apex extends longitudinally generally parallel to the length for a distance of at least 5 inches. Optionally, the hand positioning accessory comprises a distal tapered region adjacent to the distal end. Optionally, the proximal end and distal end are curved. Optionally, the sporting good is a metal or wooden bat. Optionally, the sporting good is approved for use in competition—e.g., cleared for use by USGA, USSSA and ASA, (USABat), NCAA and NFHS.

BRIEF SUMMARY OF THE DRAWINGS

FIG. 2 illustrates a side perspective view of the bat of FIG. 1A.

FIG. 3 illustrates a front elevation view of a portion of the bat of FIG. 1A.

in FIG. 11A, the dimensions and angle measurements that are provided for purposes of describing preferred embodiments; it will be understood that other dimensions are possible; the term "Rad." is an abbreviation for radius; conventional symbols for inches and degrees are also used.

FIG. 12C illustrates another side, exploded perspective view of the hand positioning accessory of FIG. 8.

FIG. 13 illustrates an interior perspective view of the hand positioning accessory of FIG. 8.

FIG. 13A illustrates an interior perspective view of the covering of the hand positioning accessory of FIG. 13.

FIG. 13B illustrates an interior perspective view of the soft core of the hand positioning accessory of FIG. 13.

FIG. 22 illustrates a side perspective view of the hand positioning accessory of FIG. 16.

FIG. 23 illustrates a proximal elevation view of the hand positioning accessory of FIG. 16.

FIG. 23A illustrates an interior perspective view of the hand positioning accessory of FIG. 16.

FIG. 28 illustrates a rear/underside elevation view of the grip of the golf club of FIG. 24.

FIG. 29 illustrates a sectional view of the grip of FIG. 28 taken along line 29-29 of FIG. 28.

FIG. 30 illustrates a sectional view of the grip of FIG. 28 taken along line 30-30 of FIG. 28.

FIG. 36 illustrates a distal elevation view of the grip of FIG. 33.

FIG. 37 illustrates a proximal elevation view of the grip of FIG. 33.

FIG. 38 illustrates a side perspective view of the grip of FIG. 33.

FIG. 39 illustrates a side elevation view of a bat with an integral hand positioning accessory according to another embodiment of the present invention.

FIG. 40 illustrates a front elevation view of the bat of FIG. 39.

in FIG. 42, grip tape/grip wrap is positioned over the hand positioning accessory.

DETAILED DESCRIPTION

Figure 1A:
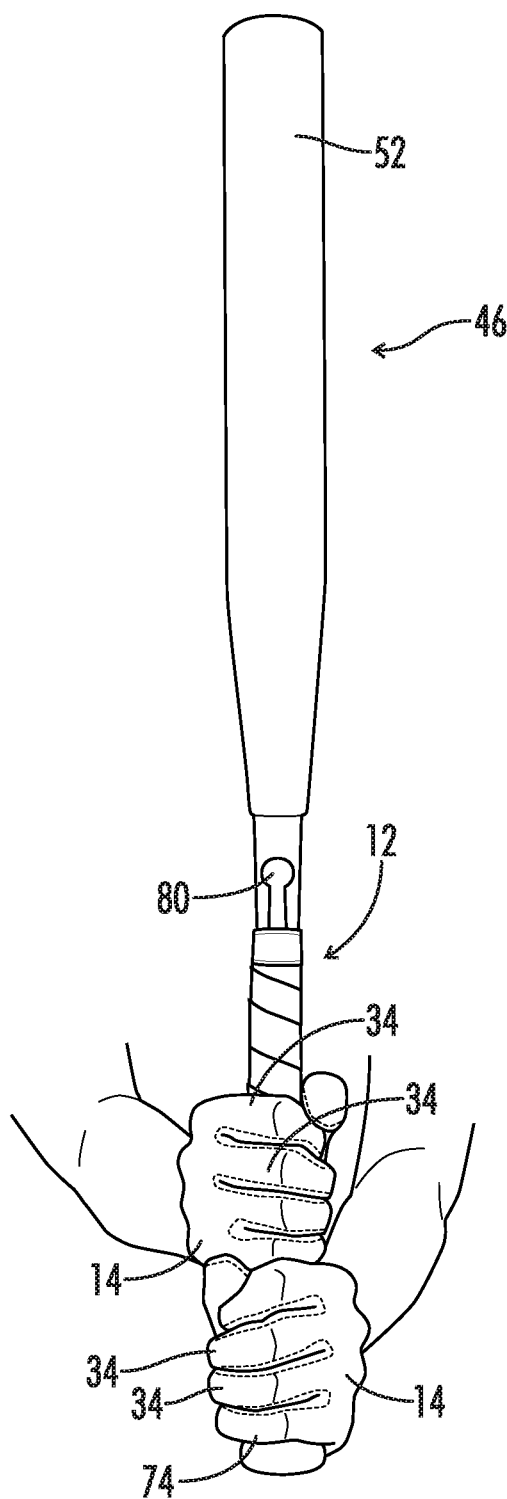
FIG. 1A illustrates a front perspective view of a person holding a bat that includes a grip wrap/grip tape around a hand positioning accessory of one embodiment of the present invention.
Figure 1B:
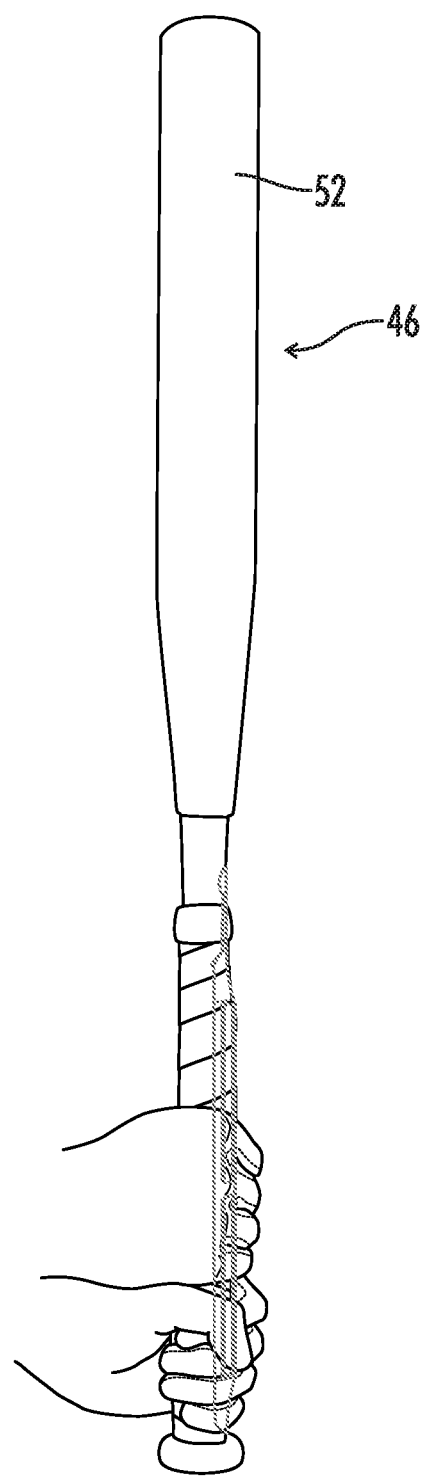
FIG. 1B illustrates a side perspective view of the person and bat of FIG. 1A.

With reference to FIGS. 1-51, the present invention provides a hand positioning accessory designated by the numeral 10. In the drawings, not all reference numbers are included in each drawing for the sake of clarity. It will be understood that the drawings are to scale but other dimensions are possible.

Figure 16:
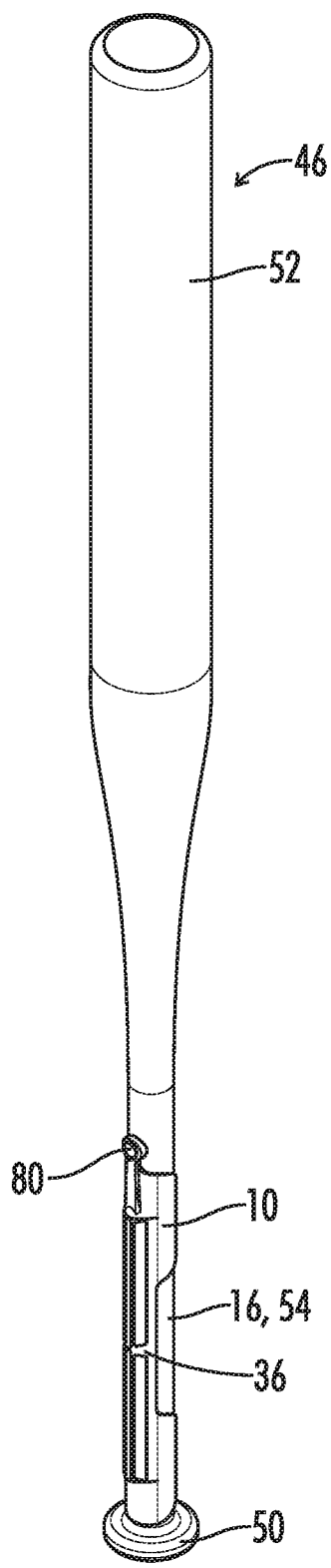
FIG. 16 illustrates a front perspective view of a bat that includes a hand positioning accessory of another embodiment of the present invention.
Figure 17:
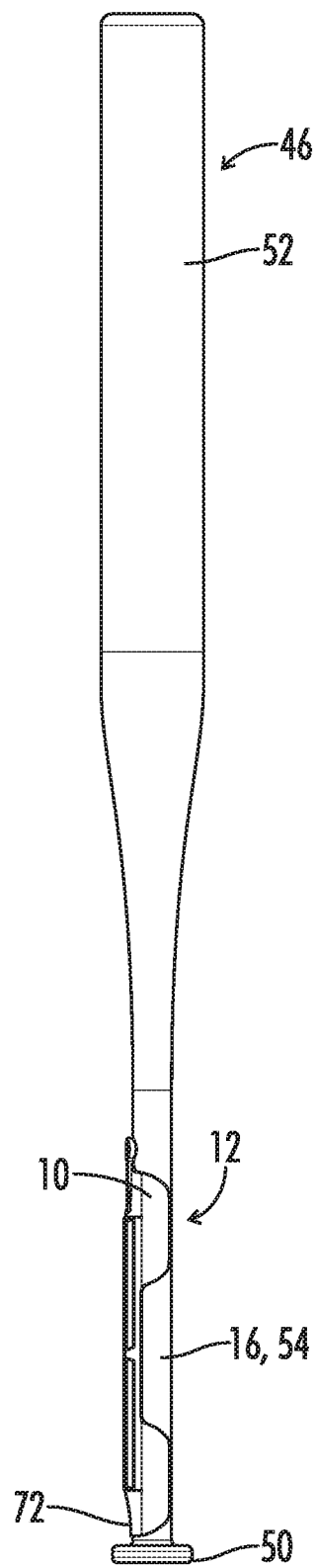
FIG. 17 illustrates a side elevation view of the bat of FIG. 16.
Figure 18:
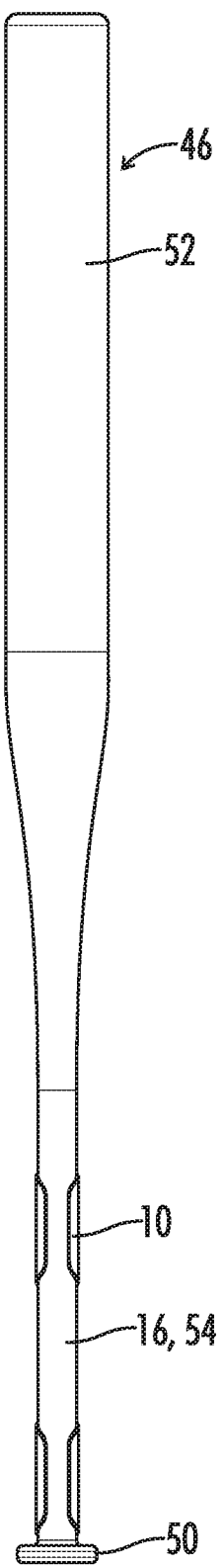
FIG. 18 illustrates a rear elevation view of the bat of FIG. 16.
Figure 19:
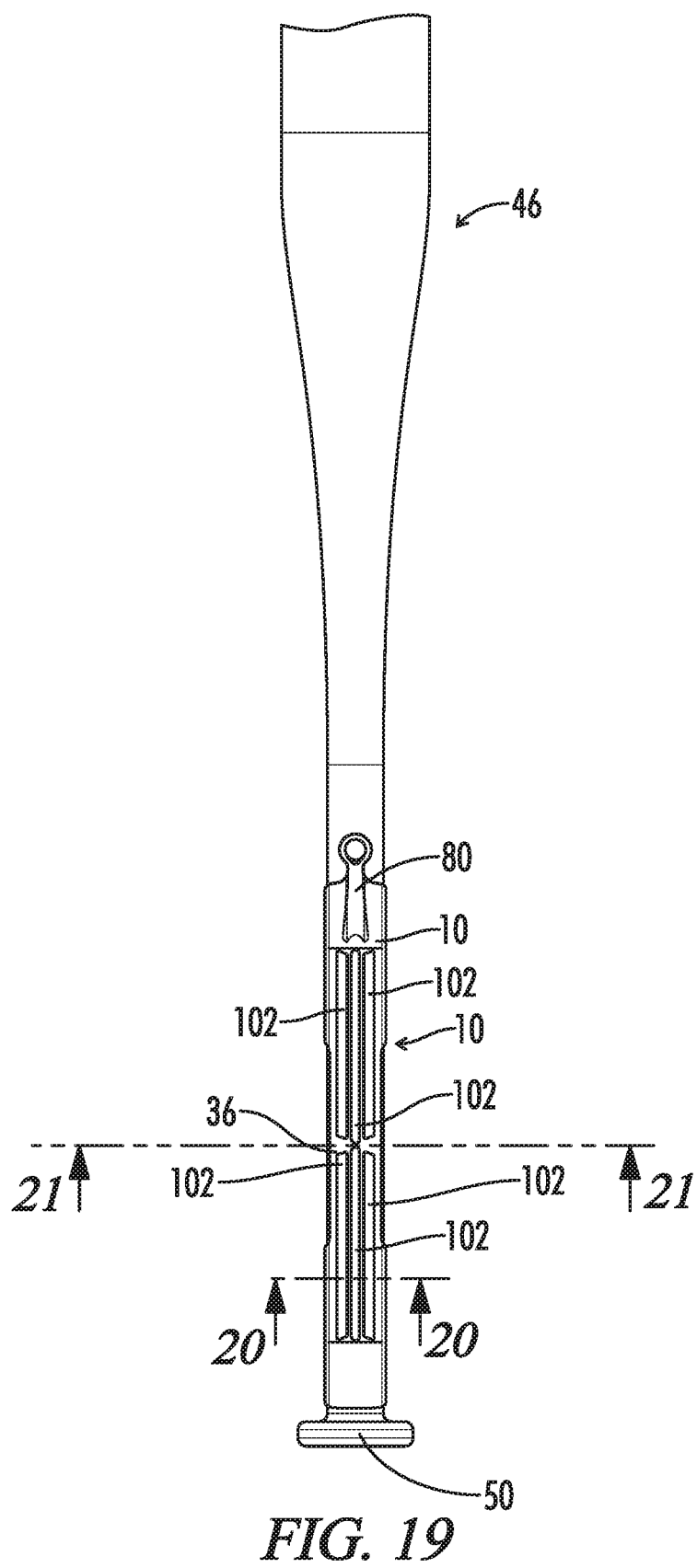
FIG. 19 illustrates a side elevation view of a portion of the bat of FIG. 16.
Figure 20:
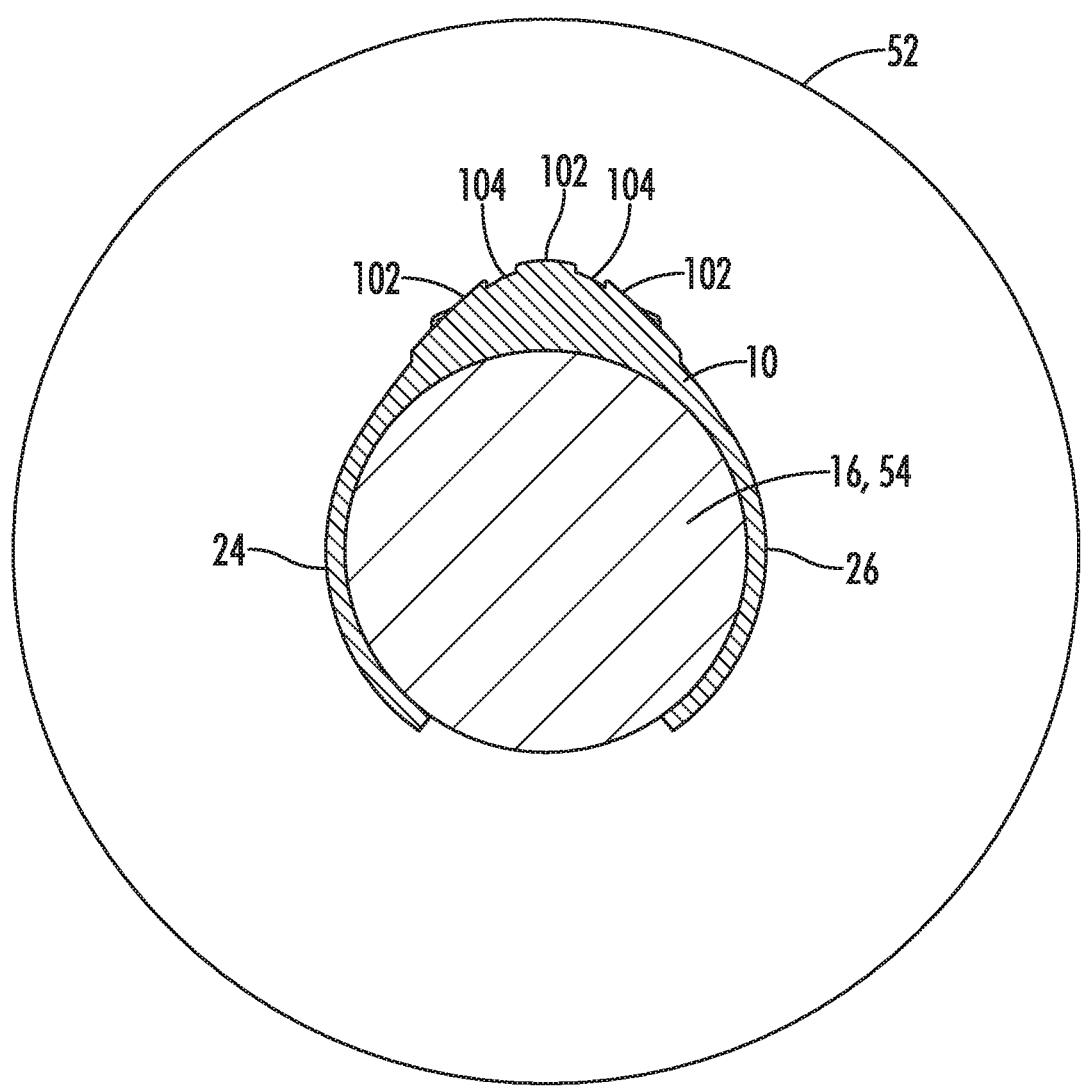
FIG. 20 illustrates a sectional view of the bat of FIG. 19 taken along line 20-20 of FIG. 19.
Figure 21:
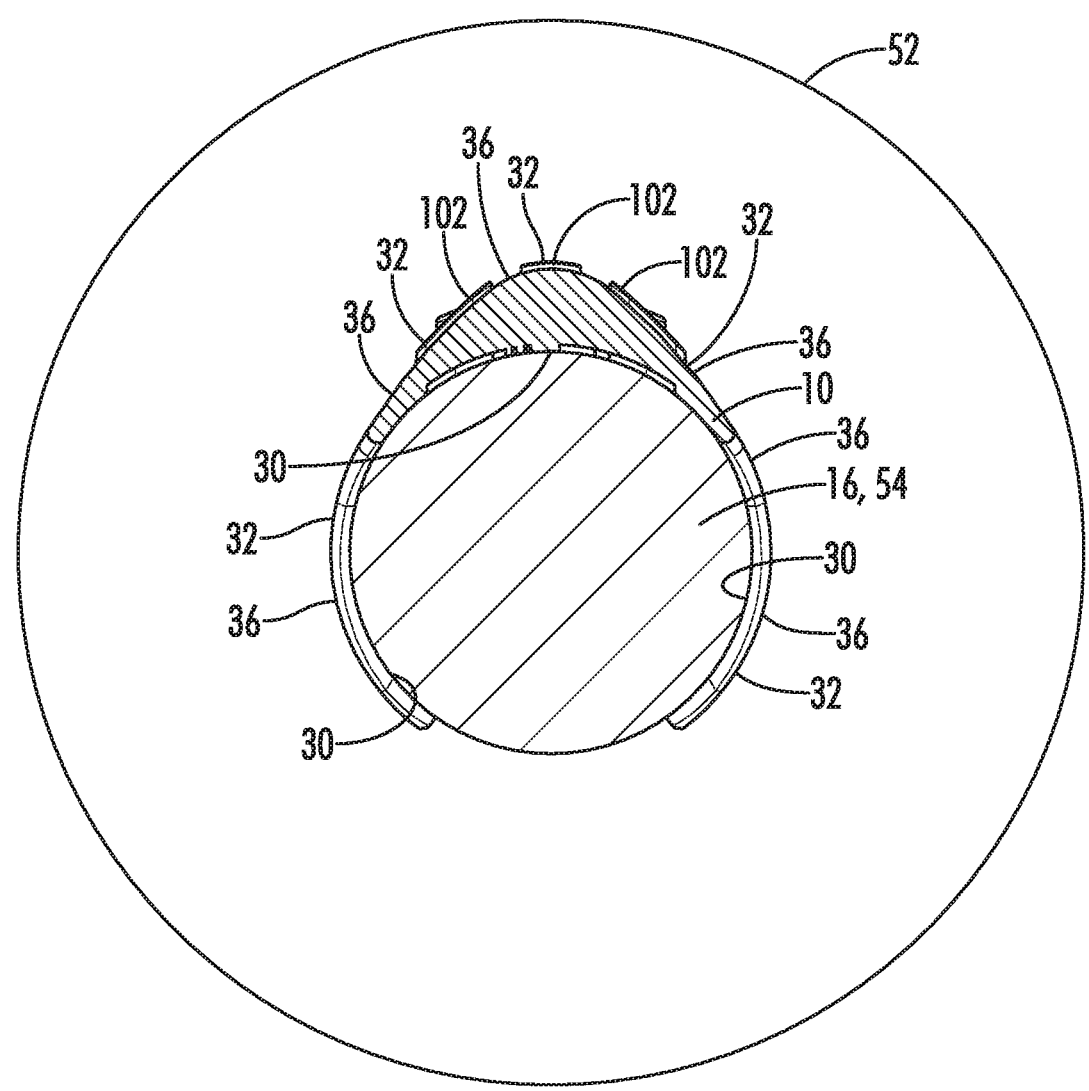
FIG. 21 illustrates a sectional view of the bat of FIG. 19 taken along line 21-21 of FIG. 19.
Figure 41:
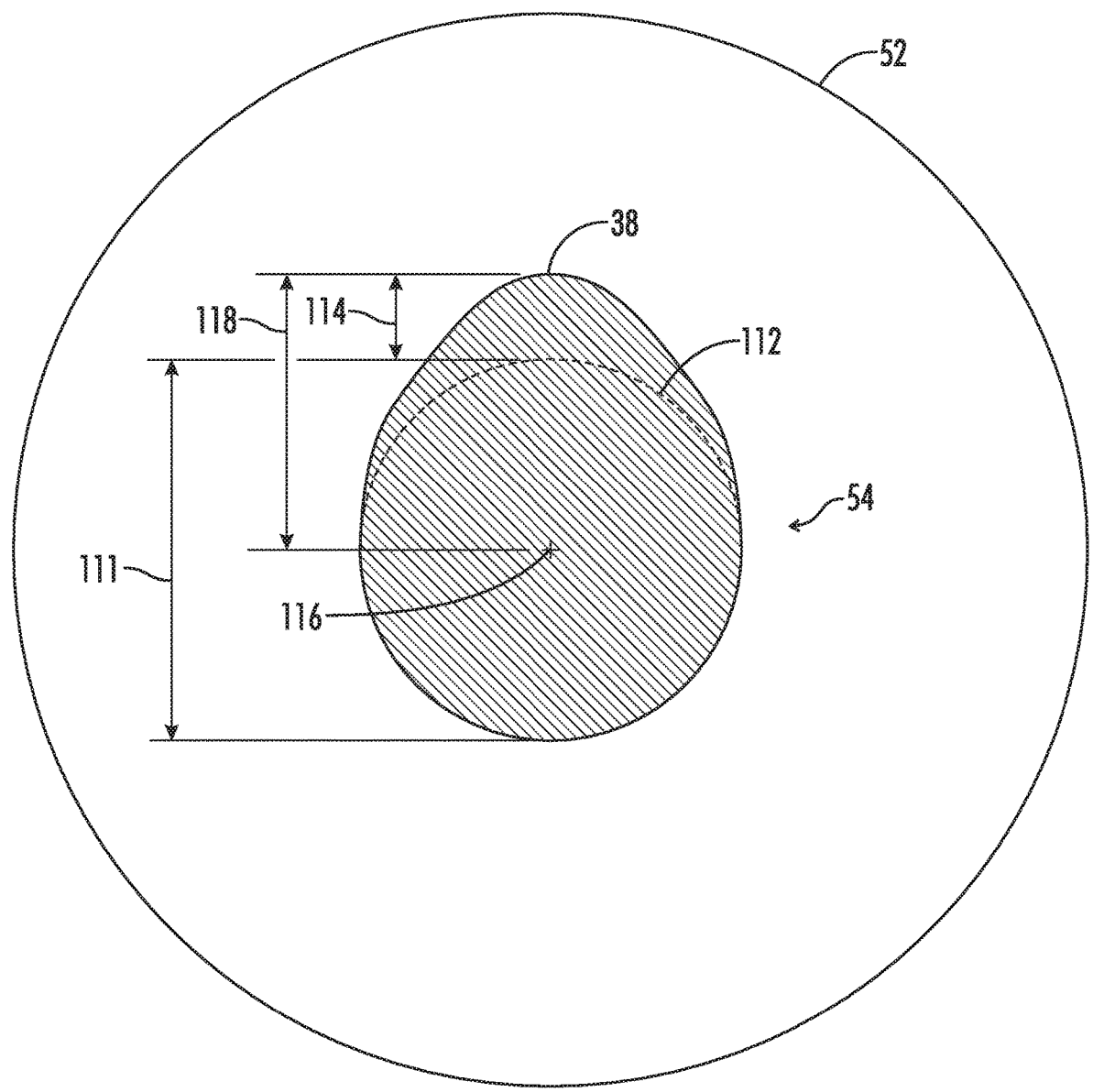
FIG. 41 illustrates a sectional view of the bat of FIG. 39 taken along line 41-41 of FIG. 39.
Figure 42:
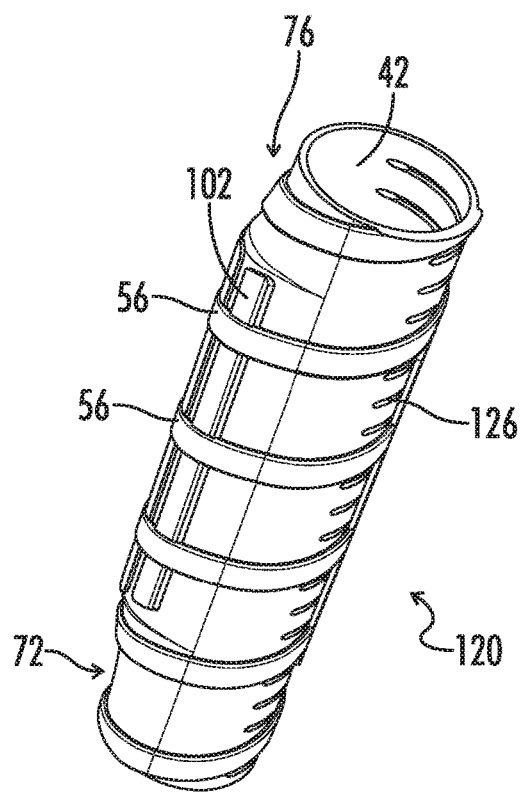
FIG. 42 illustrates a side perspective view of a proximal section of a hand positioning accessory of another embodiment of the present invention.
Figure 43:
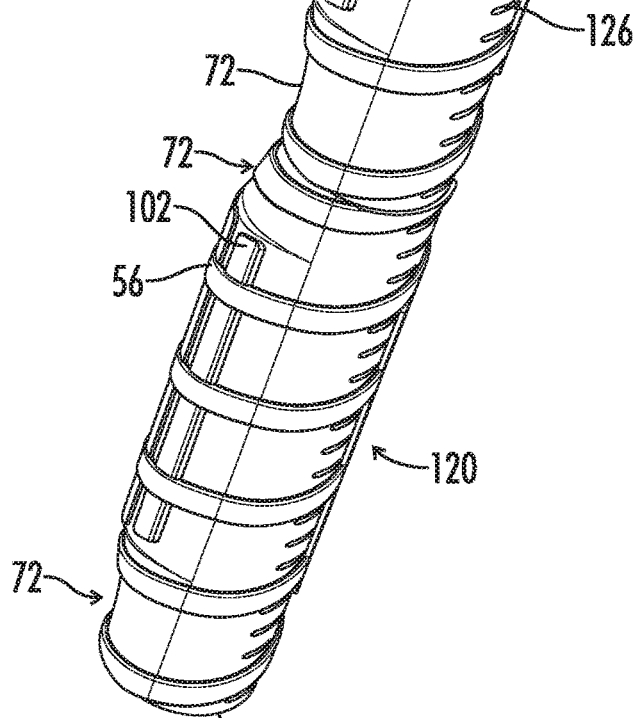
FIG. 43 illustrates a side perspective view of the proximal section of the hand positioning accessory of FIG. 42 next to the distal section of the hand positioning accessory; the proximal and distal sections would ordinarily be located on the handle of a bat or other sporting good but the bat is not shown in FIG. 43 for clarity.
Figure 44:
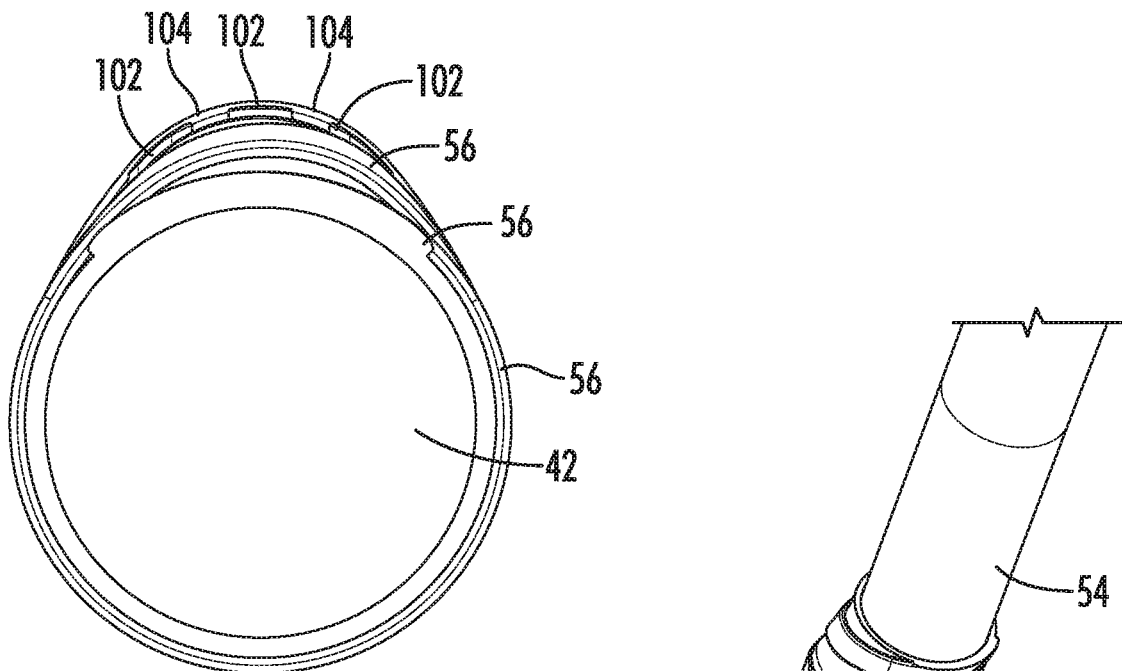
FIG. 44 illustrates a proximal elevation view of the hand positioning accessory of FIG. 43.
Figure 45:
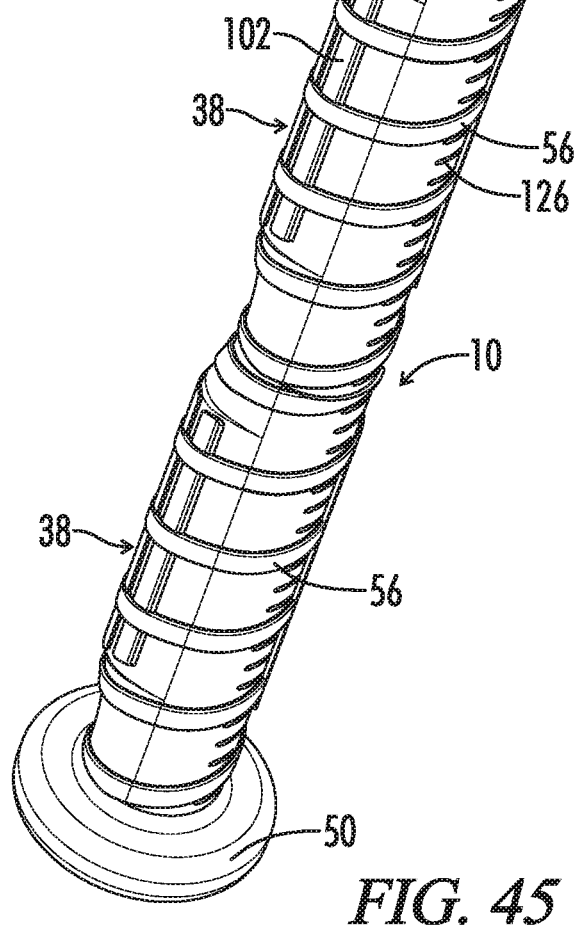
FIG. 45 illustrates a side perspective view of the hand positioning accessory of FIG. 43 located on a bat.
Figure 46:
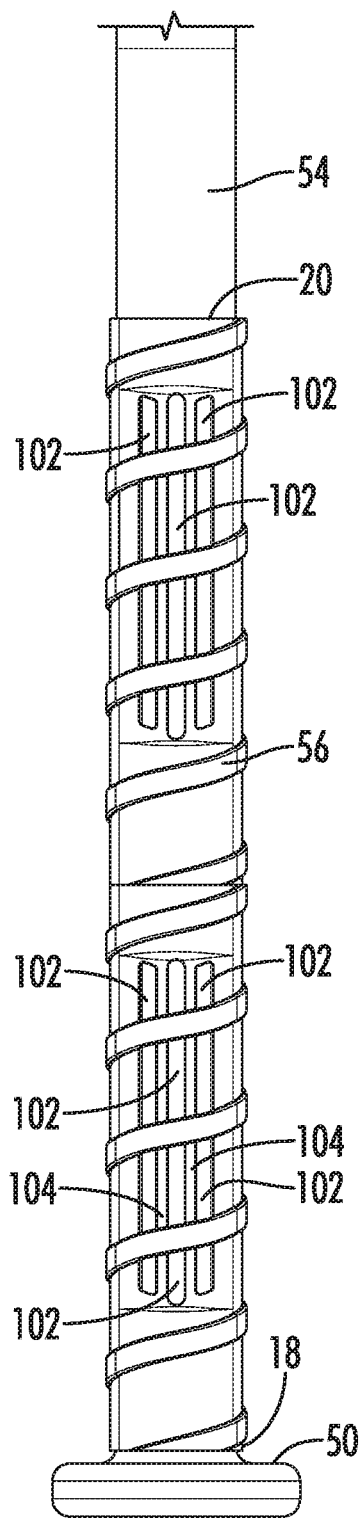
FIG. 46 illustrates a front elevation view of the hand positioning accessory of FIG. 43 located on a bat.
Figure 47:
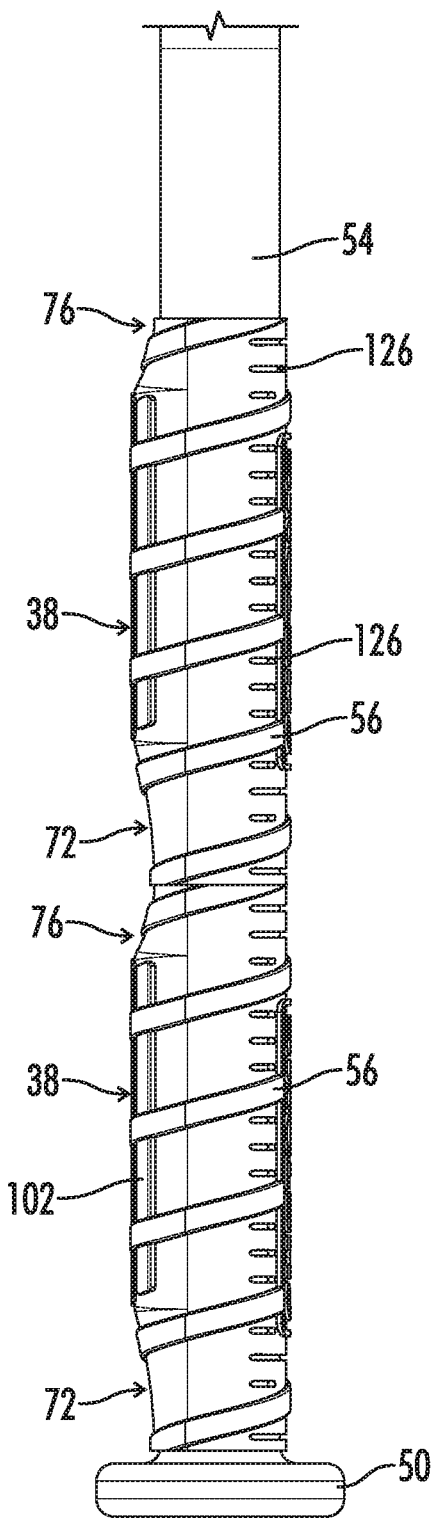
FIG. 47 illustrates a side elevation view of the hand positioning accessory of FIG. 43 located on a bat.
Figure 48:
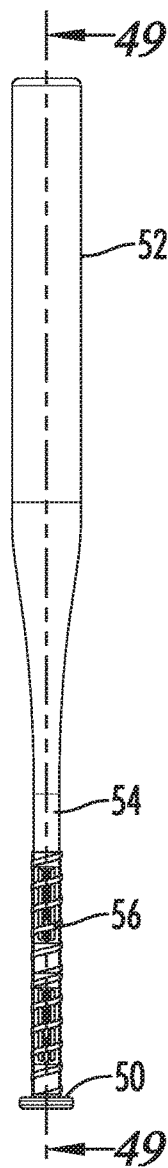
FIG. 48 illustrates a front elevation view of the hand positioning accessory of FIG. 43 located on a bat.
Figure 49:
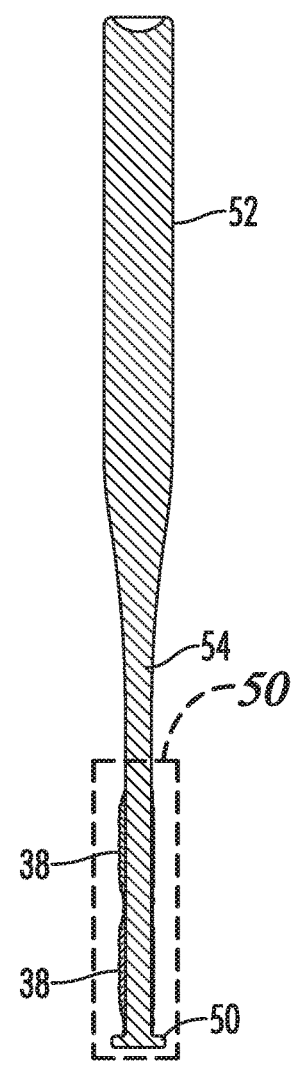
FIG. 49 illustrates a sectional view of the hand positioning accessory and bat taken along line 49-49 of FIG. 48.
Figure 50:
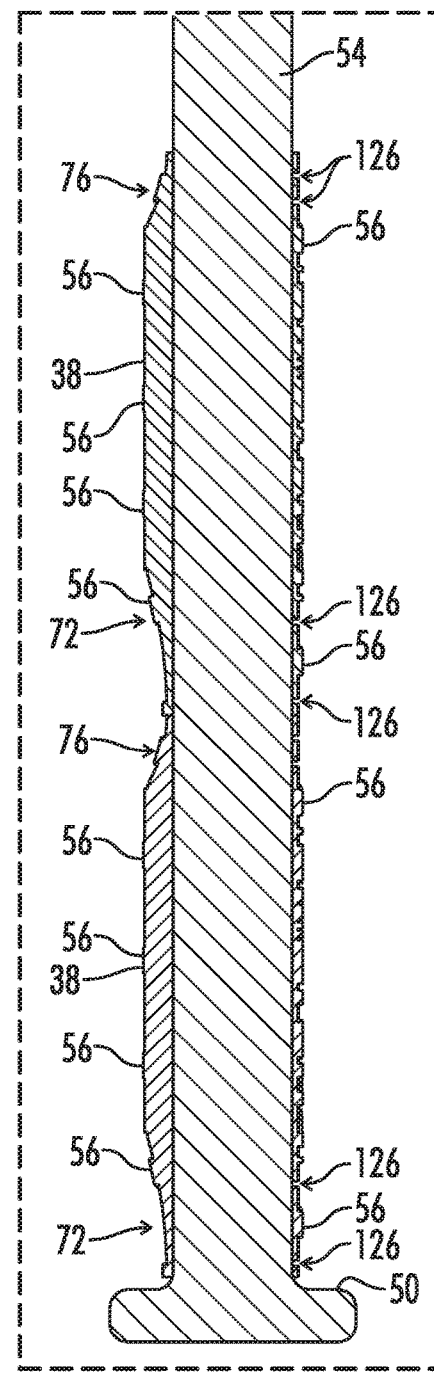
FIG. 50 illustrates a sectional view of the hand positioning accessory and bat shown in the rectangular box of FIG. 50.
Figure 51:
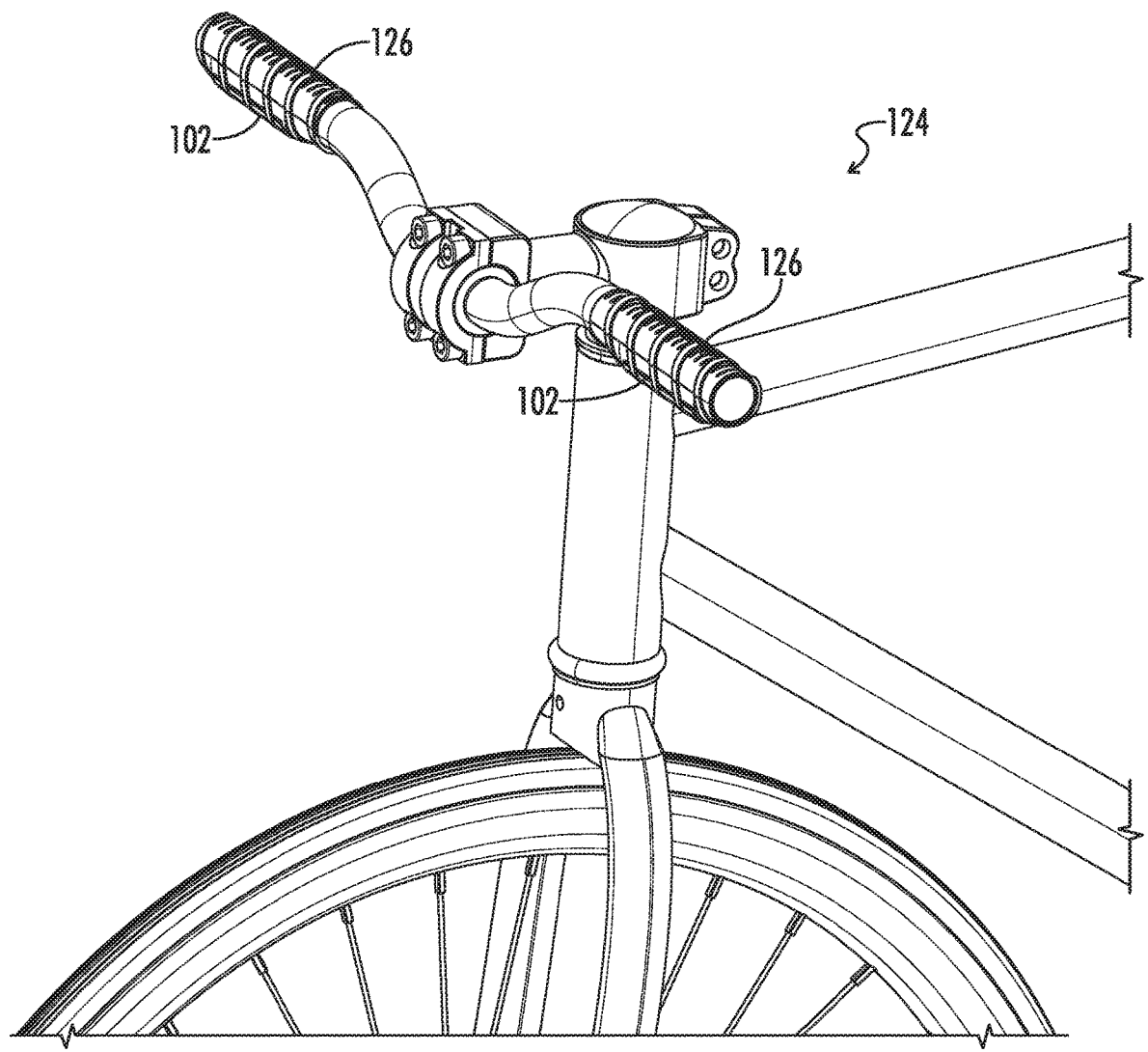
FIG. 51 illustrates a side perspective view of a bicycle with a hand positioning accessory of an embodiment of the present invention.

FIGS. 1-15 illustrate one embodiment of a hand positioning accessory of one embodiment of the present invention in which the hand positioning accessory 10 is attached to a bat 46 and used to properly align a user's hand 14 on the bat 46. As used herein, the term "bat" includes baseball and softball bats. In the embodiment of FIGS. 1-15, grip wrap/grip tape 56 is placed over the hand positioning accessory 10 to attach the hand positioning accessory 10 to the bat 46. In the embodiment of FIGS. 1-15, the hand positioning accessory 10 is a two-material part in which a soft covering 60 comprises longitudinal ribs/protrusions 64 protruding through longitudinal slots 62 in a covering 60 as explained below. FIGS. 16-23 illustrate another embodiment of a hand positioning accessory 10 that is also used on bats 46. The embodiment of FIGS. 16-23, however, is a one-material design that clamps around the bat 46, as seen in FIGS. 16-18 for example, and is designed to be placed over the grip wrap/grip tape 56, and includes integral longitudinal ribs/protrusions 102 that create longitudinal recesses 104 between the longitudinal ribs/protrusions 102. The embodiment of FIGS. 16-23 is preferably used as a trainer in practice, as opposed to game situations. FIGS. 42-50 illustrate another embodiment of a hand positioning accessory 10 that is also used on bats 46. The embodiment shown in FIGS. 42-50 is an elastomeric, two-section design (consisting of a proximal section 120 and distal section 122) that slides over the knob 50. As illustrated in FIGS. 42-50, the embodiment may be a one-material design with integral longitudinal ribs/protrusions 102 that create longitudinal recesses 104 between the longitudinal ribs/protrusions 102. Optionally, as with other embodiments, the embodiment of FIGS. 42-50 may be customized in terms of, for example, thickness, length and width to conform to individual user preferences. FIGS. 24-32 show yet another embodiment of a hand positioning accessory 10 in which the hand positioning accessory 10 is incorporated as part of a golf grip 82. FIGS. 33-38 illustrate an embodiment of a hand positioning accessory 10 in which the hand positioning accessory 10 is incorporated as part of a golf grip 82, but as compared to the embodiment of FIGS. 24-32, the golf grip 82 has a smooth exterior surface, as opposed to raised longitudinal ribs/protrusions 102. FIGS. 39-41 illustrate yet another embodiment of a hand positioning accessory 10 in which the hand positioning accessory 10 is incorporated as part of a bat handle 54. FIG. 51 illustrates yet another embodiment of a hand positioning accessory 10 in which the hand positioning accessory 10 is incorporated as part of a handle of a bicycle 124.

Referring further to FIGS. 1-51 in some embodiments, the present disclosure provides a method of using a sporting good, such as bat 46, golf club 48 or bicycle 124. The method may include providing a sporting good that may include a handle region 12 configured to be grasped by a hand of a human user 14. The handle region 12 may include a shaft 16 and a hand positioning accessory 10 at least partially surrounding the shaft 16. The hand positioning accessory 10 may have a proximal end 18, a distal end 20, a length 22 extending from the proximal end 18 to the distal end 20, a left side 26, a right side 24, a width 28 extending from the left side 26 to the right side 24 and generally perpendicular to the length 22, an interior surface 30 facing the shaft 16, and an exterior surface 32 opposite the interior surface 30.

The exterior surface 32 may be configured to receive a plurality of fingers 34 of the human user and may include a base 36 comprising an apex 38. The hand positioning accessory 10 may also include a thickness 40 extending from the interior surface 30 to the exterior surface 32 and generally perpendicular to the length 22 and width 28. Optionally, at least a portion of the base 36 is generally convex in shape and at least a portion of the interior surface 30 of the hand positioning accessory 10 is generally concave in shape. For example, the interior surface 30 may wrap at least partially around the perimeter of the shaft 16, i.e., around the circumference of the shaft 16. Optionally, the hand positioning accessory 10 further comprises a recess/hollow interior 42 that is located interiorly relative to the interior surface 30, that receives the shaft 16 and that optionally extends from the left side 26 to the right side 24. Optionally, the apex 38 is curved and the apex 38 has a radius of curvature 44 of between about 0.15 inches to about 0.4 inches. Optionally, the thickness 40 of the hand positioning accessory 10 at the apex 38, as measured from the interior surface 30 to the apex 38, is between about 0.1 inches to about 0.5 inches. In other words, optionally, the apex 38 (and preferably the entire base 36) protrudes no more than 0.5 inches radially from the shaft 16. Optionally, the entire exterior surface 32 of the hand positioning accessory 10 is located no more than 0.5 inches radially from the shaft 16. Preferably, the aforementioned measurements for the radius of curvature 44 and the thickness 40 are taken in the area of the hand positioning accessory 10 in which the user's fingers 34 wrap around/grip the hand positioning accessory 10 excluding any narrowly profiled regions, such as the proximal tapered region 72 shown in FIGS. 4 and 17 (for example), that is specifically designed for a user's pinky finger 74. Optionally, the apex 38 is located approximately in the center 96 of the hand positioning accessory width 10.

Optionally, the method further includes wrapping at least some fingers 34 of the human user around (but not necessarily directly on top of) the hand positioning accessory 10. It will be appreciated in such step, a grip wrap/grip tape 56 may be located between the hand positioning accessory 10 and the user's fingers 34 (i.e., a grip wrap/grip tape 56 may be located on the hand positioning accessory 10), as shown in FIGS. 1-3 and FIGS. 42-50 for example. Optionally, the method then comprises using the human user's hand 14 to move the sporting good (e.g., swinging the sporting good). Optionally, the hand positioning accessory 10 only extends around partially around the shaft 16, as is the case with the embodiments of FIGS. 1-23 and FIGS. 39-41 but not the embodiments of FIGS. 24-38 and FIGS. 42-51. Optionally, the entire base 36 is generally convex in shape, the entire interior surface 30 of the hand positioning accessory 10 is generally concave in shape and/or the entire hand positioning accessory 10 is generally in the shape of an arch, as is the case with the embodiments of FIGS. 1-23 and FIGS. 39-41 but not the embodiments of FIGS. 24-38 and FIGS. 42-51. Optionally, the shaft 16 is generally cylindrical in shape or at least radiused. Optionally, the sporting good is selected from the group consisting of a bat 46, a golf club 48, barbell, dumbbell, a lacrosse stick or a bicycle. Optionally, as is the case with the embodiments of in FIGS. 1-23, the sporting good is a bat 46 that further comprises a knob 50 located proximal to the hand positioning accessory proximal end 18 and a barrel 52 located distal to the hand positioning accessory distal end 20, and the shaft 16 is the handle 54 of the bat 46. Optionally, as previously alluded to and shown in FIGS. 1-3 and 42-50, the hand positioning accessory 10 is attached to the handle 54 by a grip wrap/grip tape 56, and the grip wrap/grip tape 56 is positioned between the user's fingers 34 and the hand positioning accessory 10 (i.e., under the fingers 34 and above the hand positioning accessory 10). Optionally, the hand positioning accessory 10 is removably attached to the shaft 16 (e.g., via reusable adhesive, grip wrap/grip tape 56 as shown in FIGS. 1-3 and 42-50, or a clamping mechanism as shown in FIGS. 16-21 for example). As shown in FIGS. 42-50, the hand positioning accessory 10 may be comprised of an elastomeric material (e.g., rubber, silicone, or a copolymer) that stretches to slide over the knob 50 and then fits snuggly over the bat handle 54—i.e., the recess/hollow interior 42 expands to fit over the knob 50 and then contracts around the bat handle 54.

Figure 8:
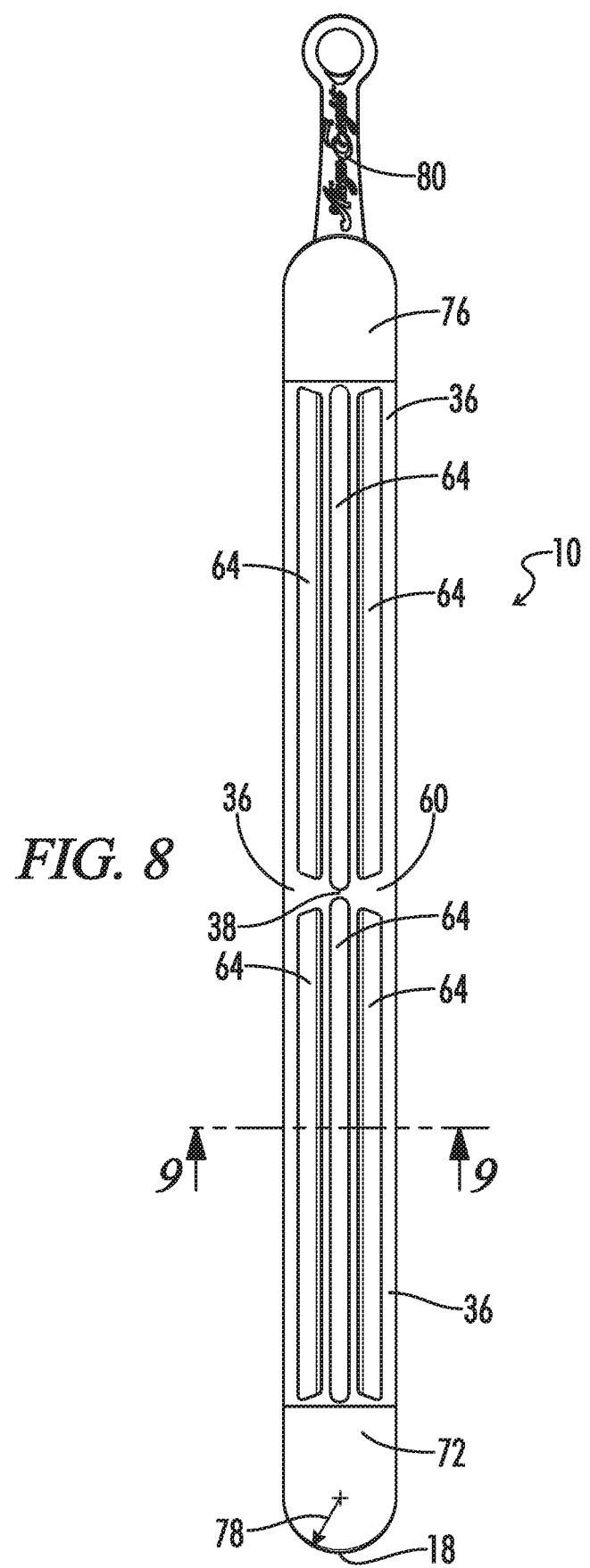
FIG. 8 illustrates a front elevation view of the hand positioning accessory of FIG. 1A.
Figures 14, 14A, 14B:
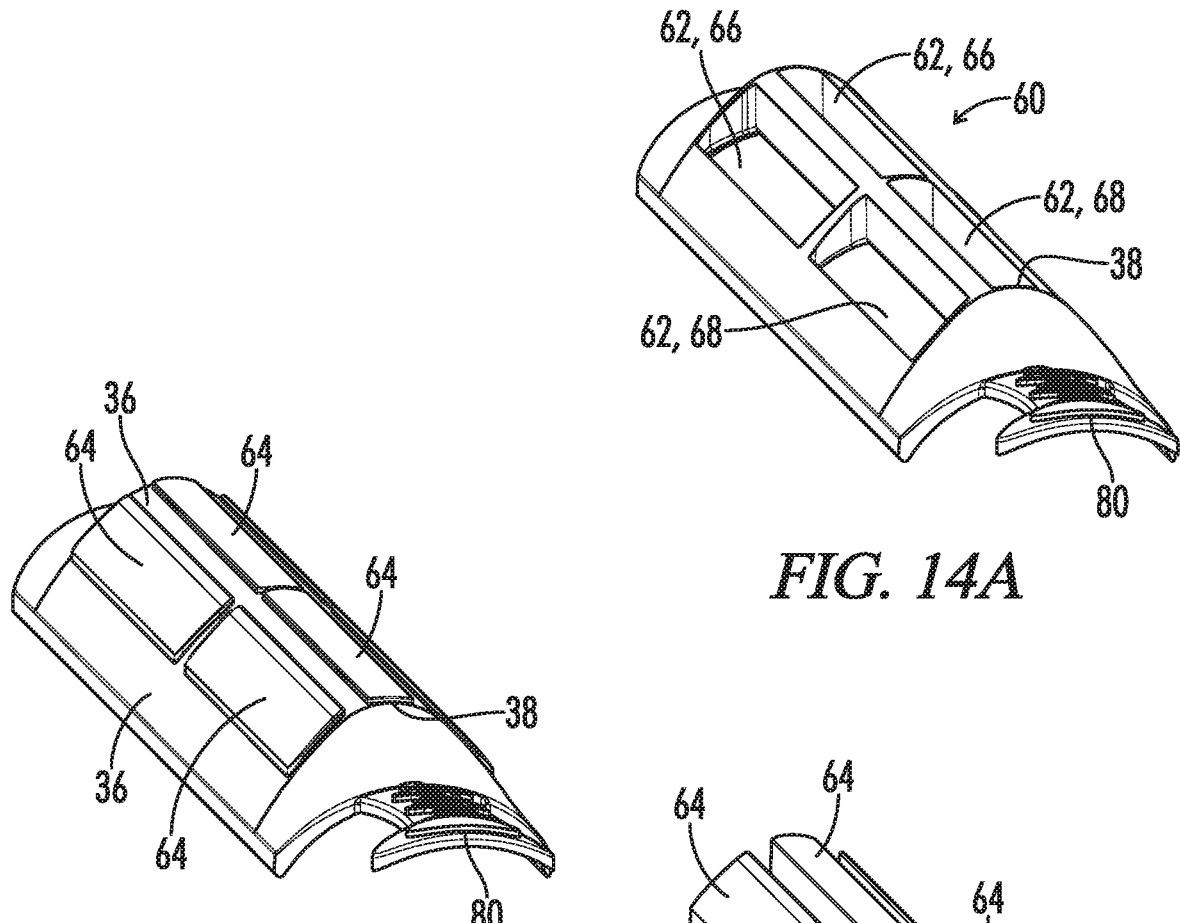
FIG. 14 illustrates a distal perspective view of the hand positioning accessory of FIG. 8.
FIG. 14A illustrates a distal perspective view of the covering of the hand positioning accessory of FIG. 14.
FIG. 14B illustrates a distal perspective view of the soft core of the hand positioning accessory of FIG. 14.
Figure 15:
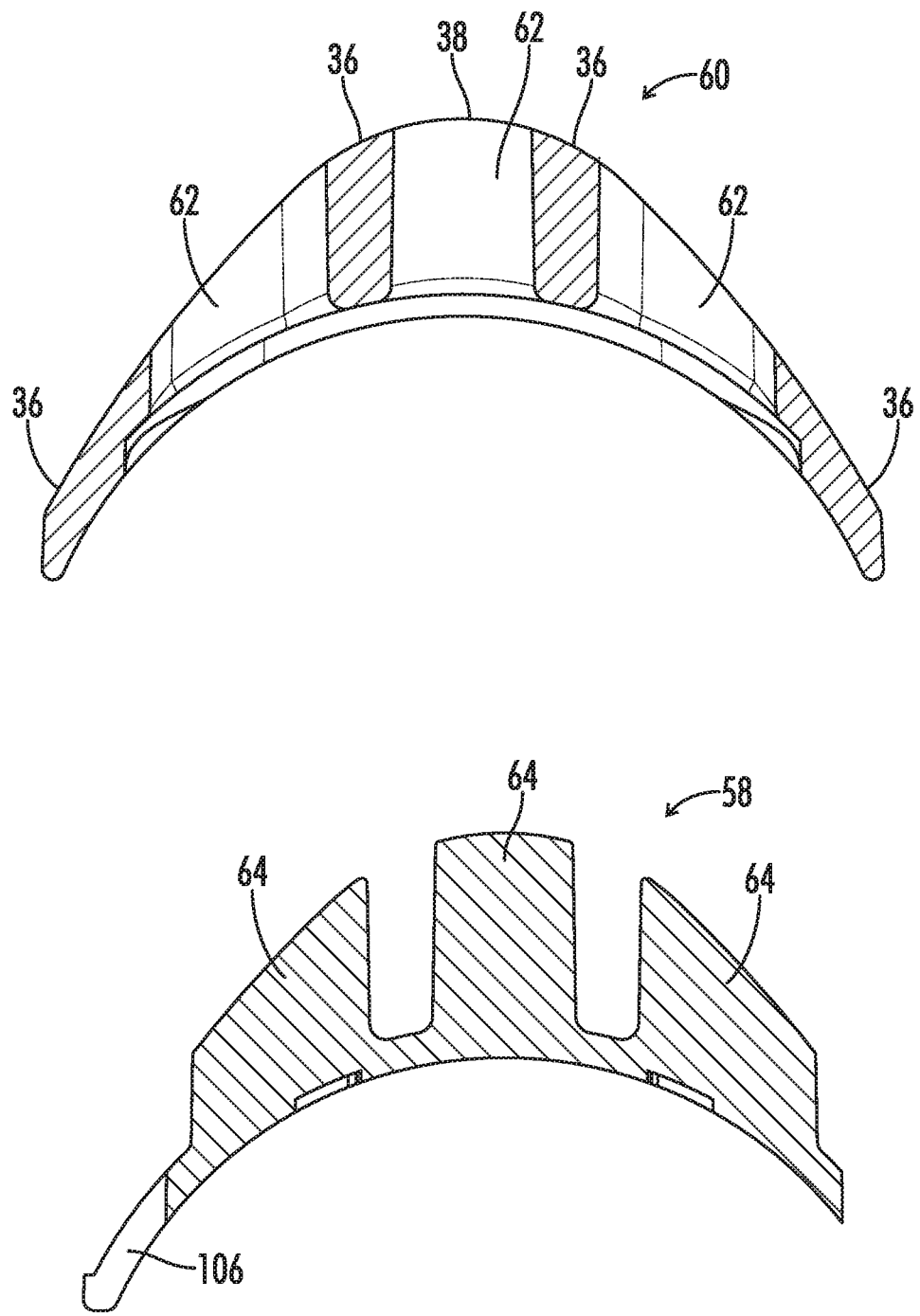
FIG. 15 illustrates a side sectional view of the hand positioning accessory of FIG. 14.

Optionally, the apex 38 extends longitudinally generally parallel to the length for a distance of at least 5 inches (e.g., about 5 inches and about 10 inches). Optionally, the hand positioning accessory 10 is generally semi-cylindrical in shape with a hollow interior 42. Optionally, as the case with the embodiments of FIGS. 1-23 and 42-50, for example, the shaft 16 is generally cylindrical in shape and has a diameter of between about 0.7 inches and about 1 inch (e.g., about 0.8 inches). Optionally, the recess/hollow interior 42 extends substantially the entire length of the hand positioning accessory 10, as shown in FIG. 13, for example. Optionally, as is the case with the embodiments of FIGS. 1-15, the hand positioning accessory 10 is comprised of a soft core 58 configured to absorb vibration from the shaft 16 and a covering 60 partially covering the soft core 58 and having a hardness greater than the soft core 58, the covering forming the base 36. The soft core 58 may also provide cushion for the user's hands 14. Preferably, purposes of the covering 60 may be to shield/protect the soft core 58, provide durability and a bat-like feel under the grip wrap/grip tape 56 if used in conjunction with a bat 46. In addition, the covering 60 may provide instant reaction from the motion of the user's hands 14 to the bat 46. Without being bound by any particular theory, if the covering 60 was soft, the covering 60 would have a delayed response on a swing from the batter's (user's) initial motion towards the ball. Optionally, the soft core 58 has a hardness of from about 30 to about 70 (Shore A) and the covering 60 has a hardness of from about 70 to about 125 (Shore A). Optionally, as is the case with the embodiments of FIGS. 1-15, the soft core 58 and covering 60 each form a portion of the interior surface 30 and the exterior surface 32. Optionally, as is the case with the embodiments of FIGS. 1-15, the covering 60 comprises a plurality of longitudinal slots 62 and the soft core 58 comprises a plurality of longitudinal ribs/protrusions 64 protruding through the longitudinal slots 62 beyond the base 36 to form a portion of the exterior surface 32. Optionally, as shown in FIGS. 12-15 for example, the plurality of longitudinal slots 62 comprises a proximal group 66 of three longitudinal slots 62 and a distal group 68 of three longitudinal slots 62. Optionally, as best seen in FIG. 8, each longitudinal rib/protrusion 64 extends generally parallel to the hand positioning accessory length 22. Optionally, as best seen in FIG. 8, each longitudinal rib/protrusion 64 in the proximal group is aligned widthwise with a longitudinal rib/protrusion 64 in the distal group. In other words, as shown in FIG. 8, the longitudinal ribs/protrusions 64 may be arranged two rows and three columns. Optionally, as best seen in FIG. 14, the proximal group of longitudinal ribs/protrusions 64 and the distal group of longitudinal ribs/protrusions 64 each comprise a middle longitudinal rib/protrusion aligned widthwise with the apex 38. Optionally, as best seen in FIG. 14, the middle longitudinal rib/protrusion is slightly longer than the longitudinal ribs protrusions on either side.

Figure 9:
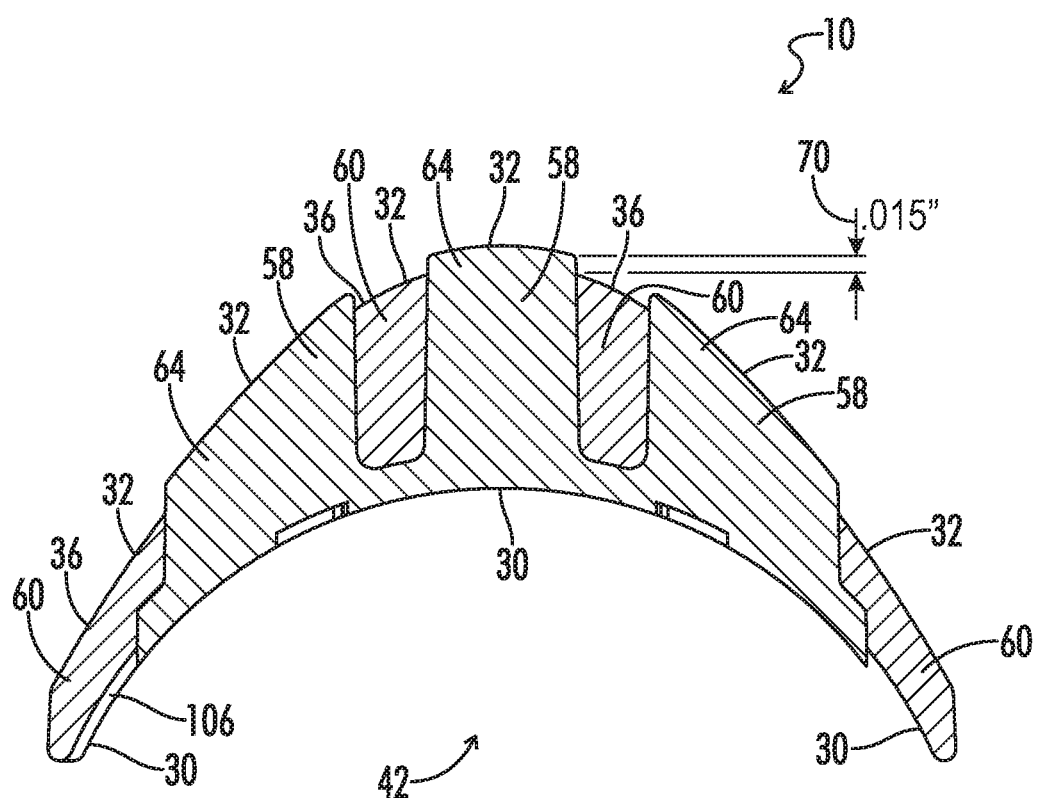
FIG. 9 illustrates a sectional view of the hand positioning accessory of FIG. 8 taken along line 9-9 of FIG. 8.
Figure 10:
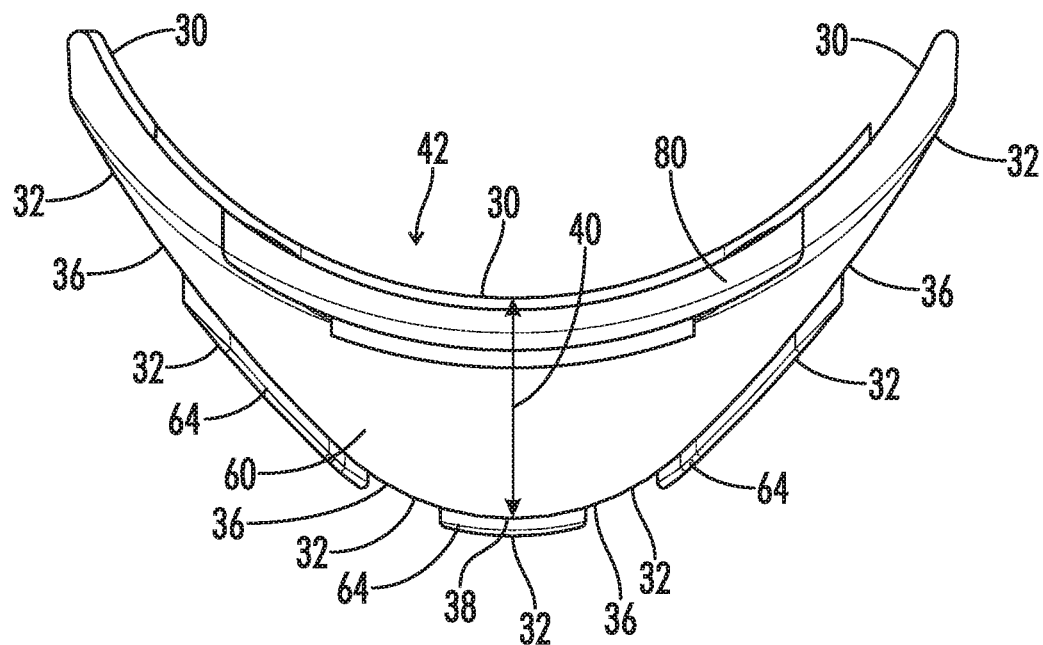
FIG. 10 illustrates a distal elevation view of the hand positioning accessory of FIG. 8.
Figure 11:
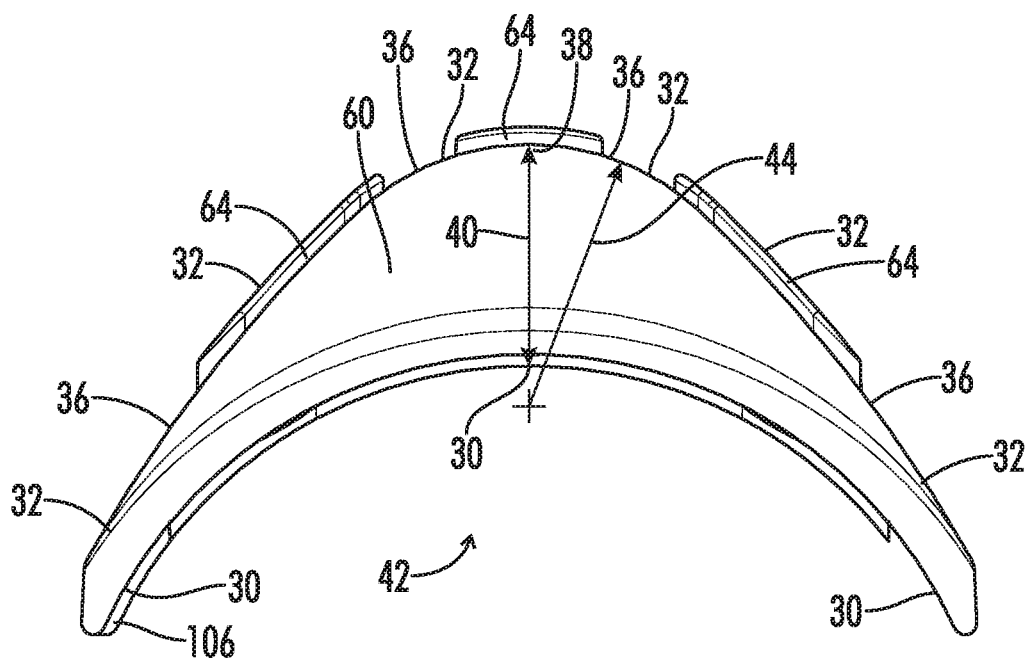
FIG. 11 illustrates a proximal elevation view of the hand positioning accessory of FIG. 8.
Figure 11A:
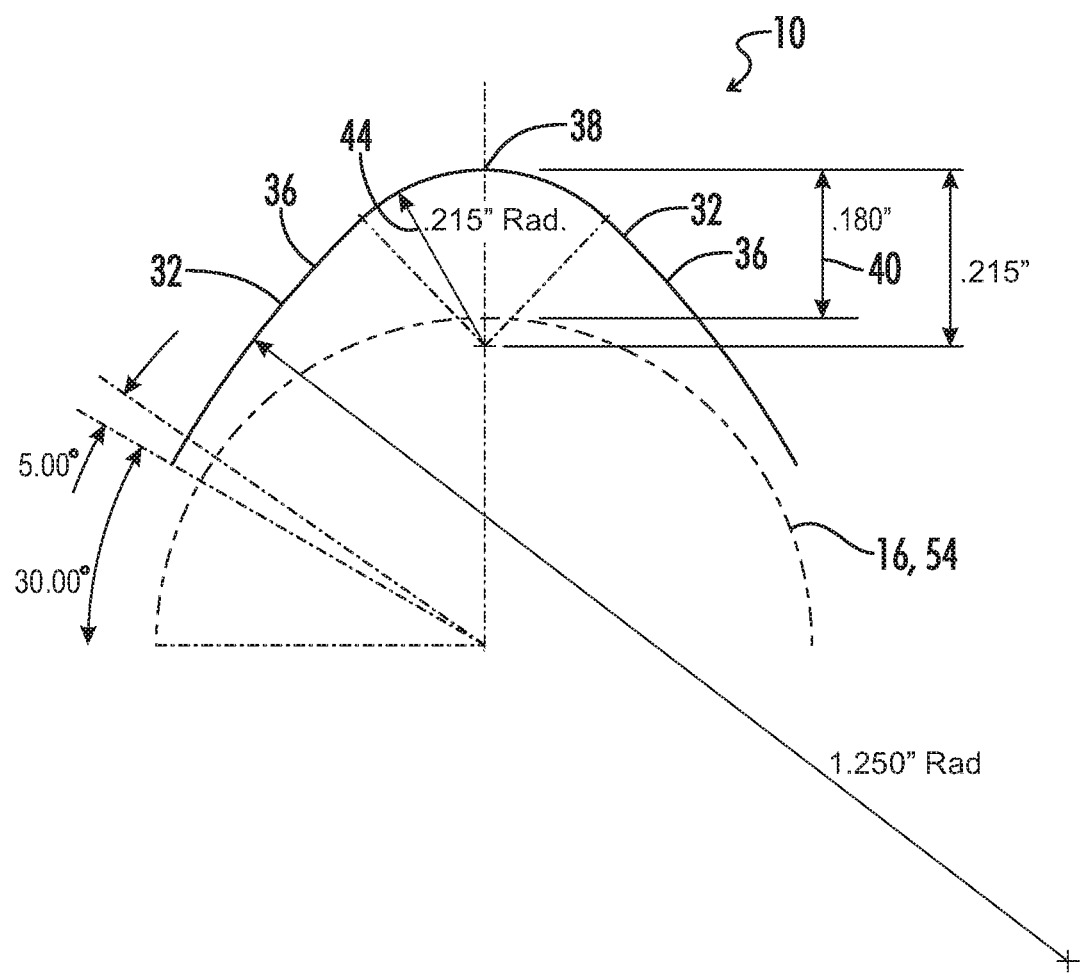
FIG. 11A illustrates a proximal schematic view of the hand positioning accessory of FIG. 8 with the longitudinal ribs/protrusions removed for purposes of more clearly seeing the dimensions and measurements.
Figures 12A, 12B:
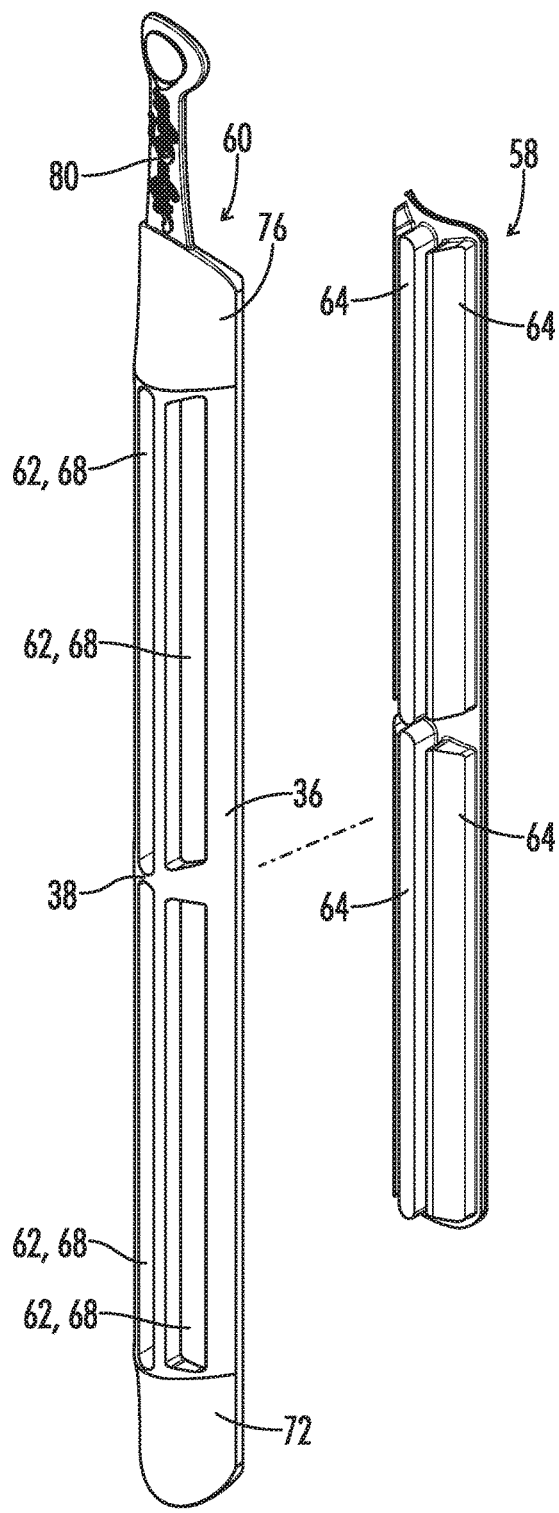
FIG. 12A illustrates a side, exploded perspective view of the hand positioning accessory of FIG. 8.
FIG. 12B illustrates another side, exploded perspective view of the hand positioning accessory of FIG. 8.

Optionally, the method further comprises placing portions of a plurality of the user's fingers 34 over portions of the longitudinal ribs/protrusions 64 protruding through the longitudinal slots 62. (As previously noted, the fingers 34 may not be located directly on the longitudinal ribs/protrusions 64, as a grip wrap/grip tape 56 may be present). Optionally, the longitudinal ribs/protrusions 64 are compressible by the user's fingers 34 but the covering 60 is preferably not compressible by the user's fingers 34 during ordinary use of the hand gripping accessory 10. The soft core 58 can be attached to the covering 60 through any suitable method including without limitation overmolding/molecular bonding the soft core 58 to the covering 60 or a snap fit mechanism between the soft core 58 and the covering 60. (In a preferred embodiment the hand positioning accessory 10 is molded and the soft core 58 is the overmold and the covering 60 is a solid substrate). Optionally, the method further comprises placing pads of a plurality of the user's fingers 34 over portions of the longitudinal ribs/protrusions 64 protruding through the longitudinal slots 62. (Optionally, the pads of the fingers 34 both before and after the middle knuckle—excluding the thumbs—are positioned over portions of the longitudinal ribs/protrusions 64 protruding through the longitudinal slots 62). Optionally, the longitudinal ribs/protrusions 64 protrude through the longitudinal slots 62 a distance 70 from about 0.05 inches to about 0.25 inches, as shown in FIG. 9 for example. Optionally, at least some (preferably all as is the case with the embodiment of FIGS. 1-15) of the longitudinal slots 62 are generally rectangular in shape. Optionally, the longitudinal slots 62 are approximately the same size. Optionally, the longitudinal slots 62 are spaced approximately equally along the width, as is the case with the embodiment of FIGS. 1-15. Optionally, the longitudinal slots 62 are approximately the same size. Optionally, the covering 60 and the soft core 58 are comprised of a co-polymer or silicone. Optionally, the soft core 58 is comprised of thermoplastic polyurethane. Optionally, the covering 60 is comprised of plastic (e.g., polypropylene, ABS, HDPE, polyethylene, etc.). Optionally, if the soft core 58 is included, the maximum distance from the interior surface 30 to the exterior surface 32 formed by the soft core 58 is also between 0.1 inches to about 0.5 inches due to the thinness of the soft core 58, as shown in FIGS. 1-15. Optionally, the soft core 58 includes a side tab 106 that fits inside a tab slot 108 in the covering 60. In a preferred embodiment, the tab slot 108 is located on the left and/or right side 24, 26 approximately in the middle of the hand positioning accessory length 22. Without being bound by any particular theory, the tab slot 108, which may be a channel leading to the hollow interior 42, may serve as an escape port for vibration. In addition, if the core 58 is overmolded, the tab slot 108 may serve as a port for the overmold.

Even if the hand positioning accessory 10 is not comprised of two different materials, the hand positioning accessory 10 may still include longitudinal ribs 102, as shown in the embodiments of FIGS. 16-32 and FIGS. 42-50. In addition, as shown in FIGS. 42-50, if the hand positioning accessory 10 has an exterior surface 32 on the side of the hand positioning accessory 10 opposite the apex 38, the exterior surface 32 may include widthwise grooves 126. The longitudinal ribs 102 may be distributed into proximal and distal groups and aligned as described previously and shown in FIGS. 16-32 and 42-50.

Figure 4:
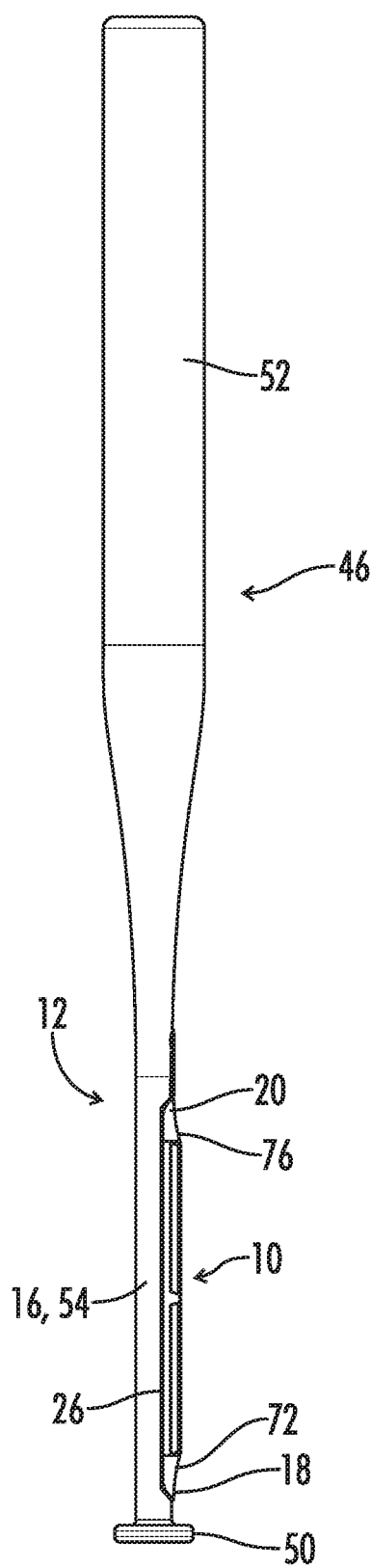
FIG. 4 illustrates a side elevation view of the bat of FIG. 1A without the grip wrap/grip tape.

Optionally, as shown in FIGS. 4, 17 and 39 for example, the hand positioning accessory 10 comprises a proximal tapered region 72 adjacent to the proximal end 18 in which the thickness increases distally. Optionally, the method further comprises placing a pinky finger 74 of the human user over the proximal tapered region 72. (Again, the grip wrap/grip tape 56 may be present). Optionally, as shown in FIG. 4 and FIG. 39 for example, the hand positioning accessory 10 comprises a distal tapered region 76 adjacent to the distal end 20 in which the thickness decreases distally. In a preferred embodiment, the proximal tapered region 72 and distal tapered regions 76 are features of the exterior surface 32 and the exterior surface 32 protrudes less radially from the shaft 16 in the proximal and distal tapered regions 72 and 76 as compared to at the apex 38, as best seen in FIGS. 4 and 39. Relatedly, in the two-section design of FIGS. 42-50, each of the proximal and distal sections may include proximal tapered regions 72 and distal tapered regions 76.

Figure 5:
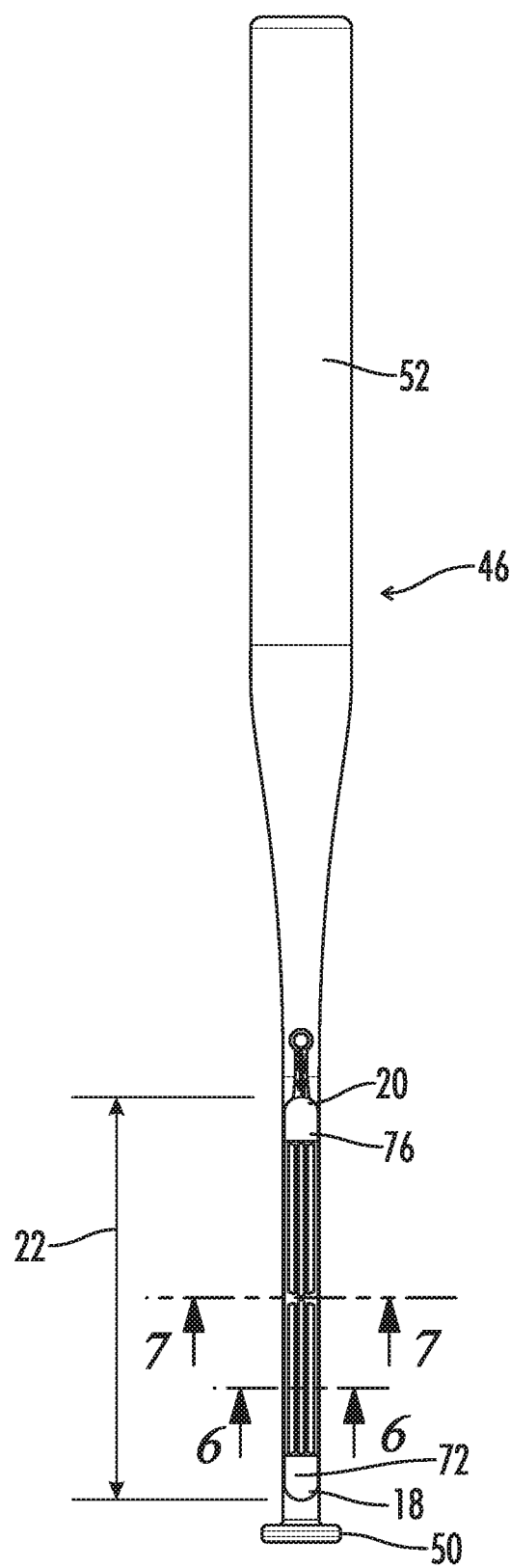
FIG. 5 illustrates a front elevation view of the bat of FIG. 4.
Figure 6:
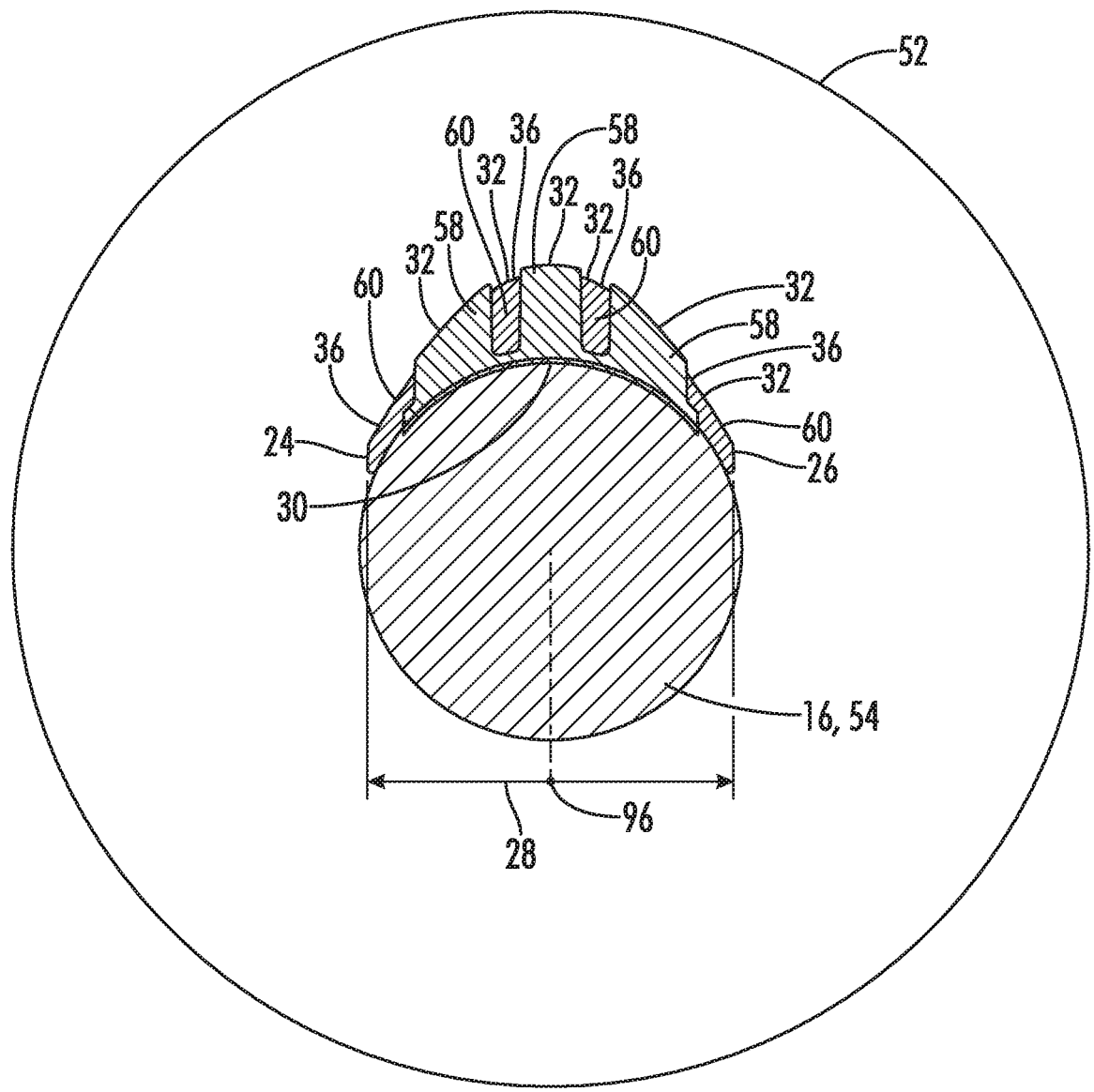
FIG. 6 illustrates a sectional view of the bat of FIG. 5 taken along line 6-6 of FIG. 5.
Figure 7:
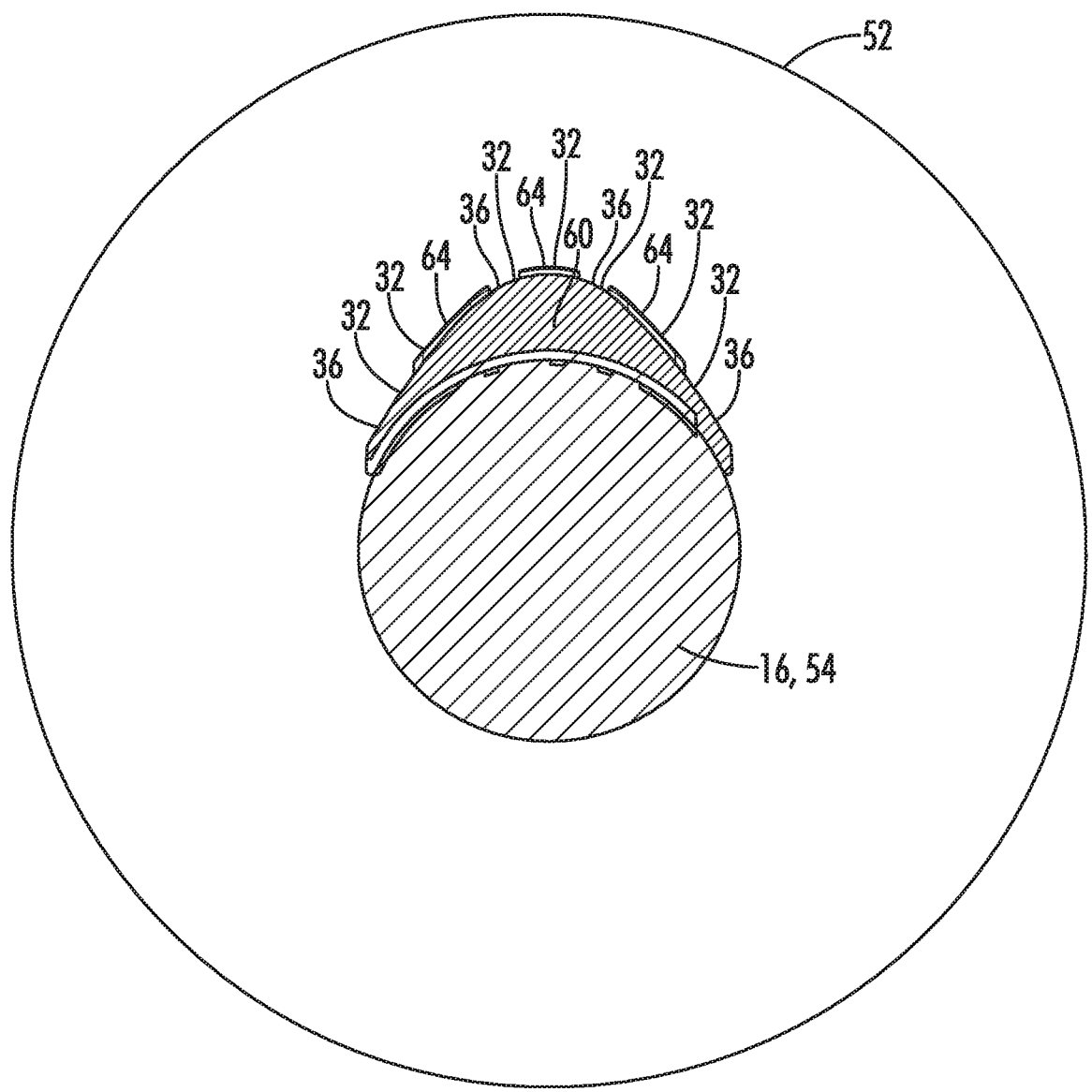
FIG. 7 illustrates a sectional view of the bat of FIG. 5 taken along line 7-7 of FIG. 5.

Optionally, as shown in FIGS. 5, 8 for example, the proximal end 18 and distal end 20 are curved. Optionally, as is the case with the embodiments of FIGS. 1-23, the hand positioning accessory 10 further comprises a tab 80 extending distally from the distal end 20. Optionally, the sporting good is a metal or wooden bat. (As used herein, metal bats includes, without limitation, composite bats, metal alloy, and aluminum). Optionally, the sporting good is approved for use in competition—e.g., cleared for use by USGA, USSSA, ASA, USABat, NCAA, NFHS, Major League Baseball, etc. Optionally, the soft covering 58 and tab 80 include branding (e.g., product names or logos).

Figures 24, 25, 26:
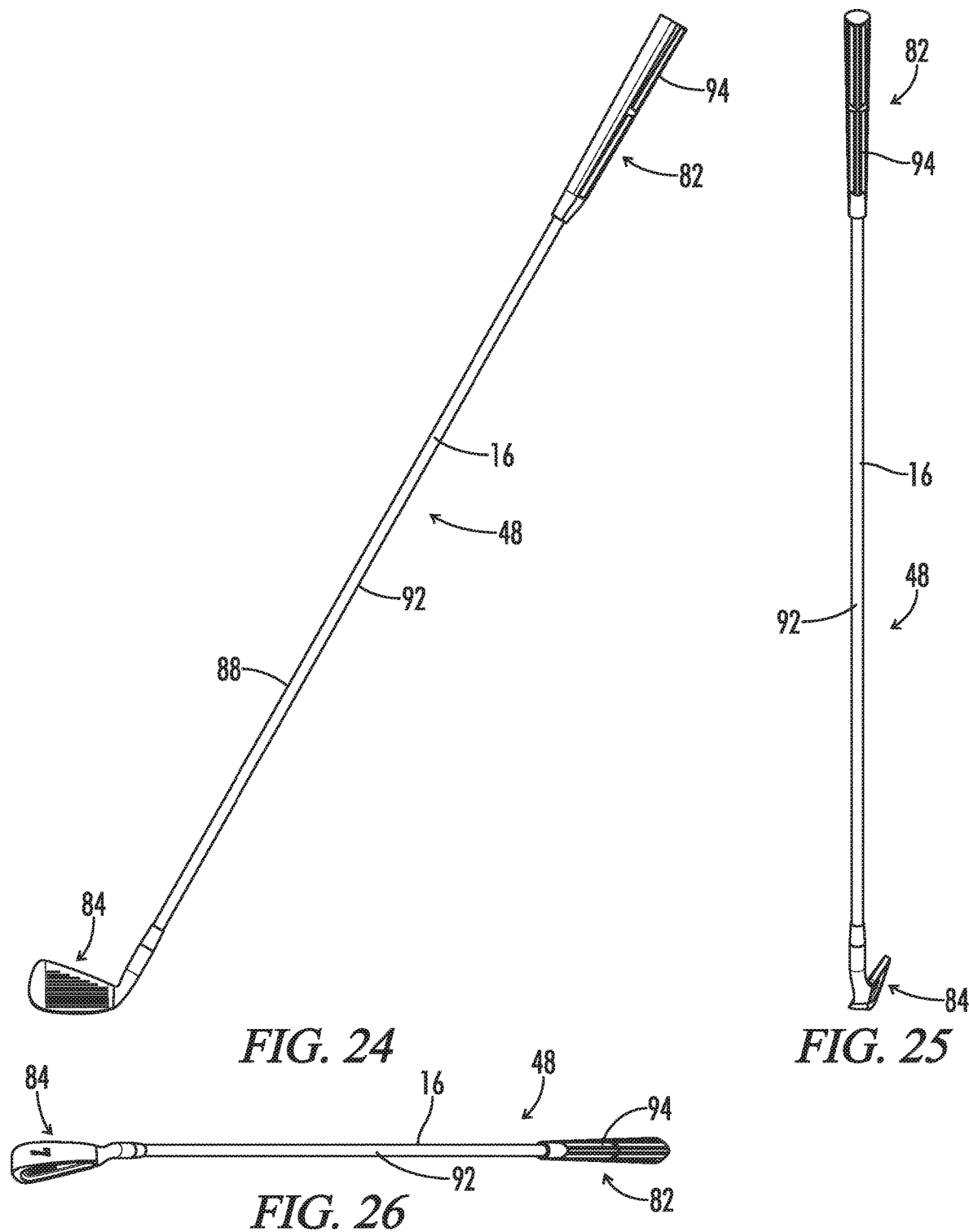
FIG. 24 illustrates a side perspective view of a golf club that includes a hand positioning accessory in the form of a grip of one embodiment of the present invention.
FIG. 25 illustrates a rear/underside elevation view of the golf club of FIG. 24.
FIG. 26 illustrates a rear/underside perspective view of the golf club of FIG. 24.
Figure 27:
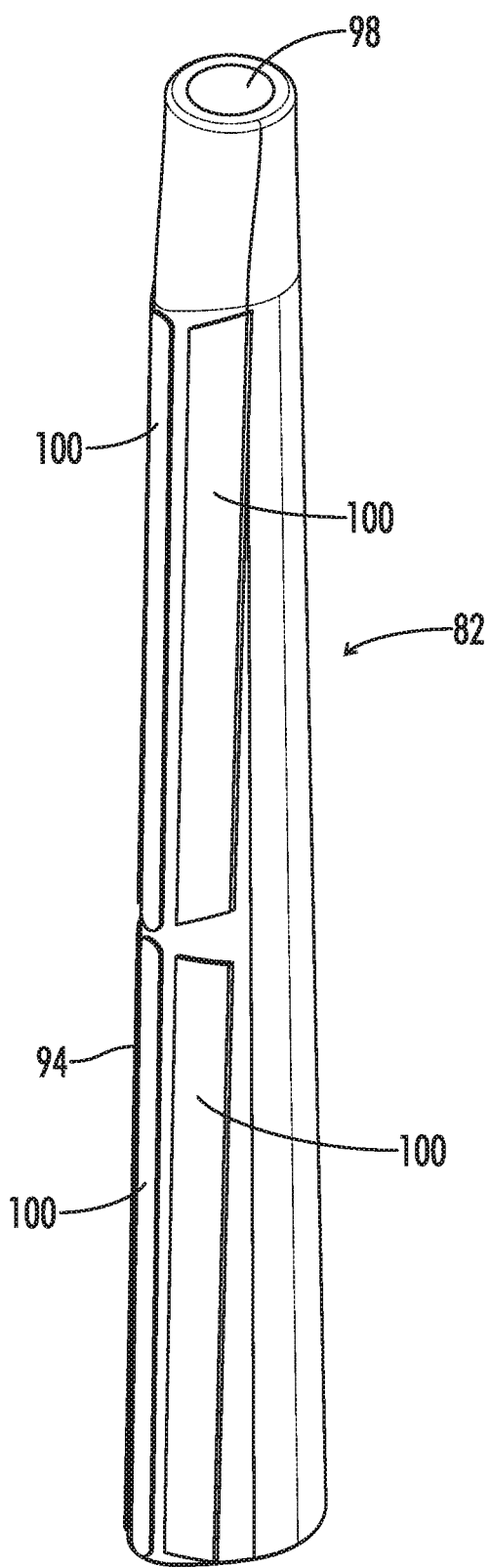
FIG. 27 illustrates a side perspective view of the grip of the golf club of FIG. 24.
Figure 32:
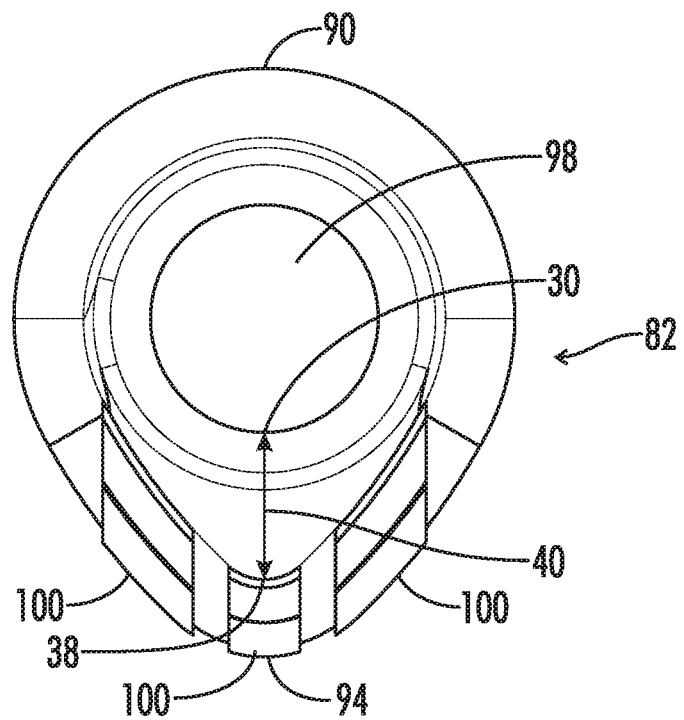
FIG. 32 illustrates a distal elevation view of the grip of FIG. 28.
Figure 31:
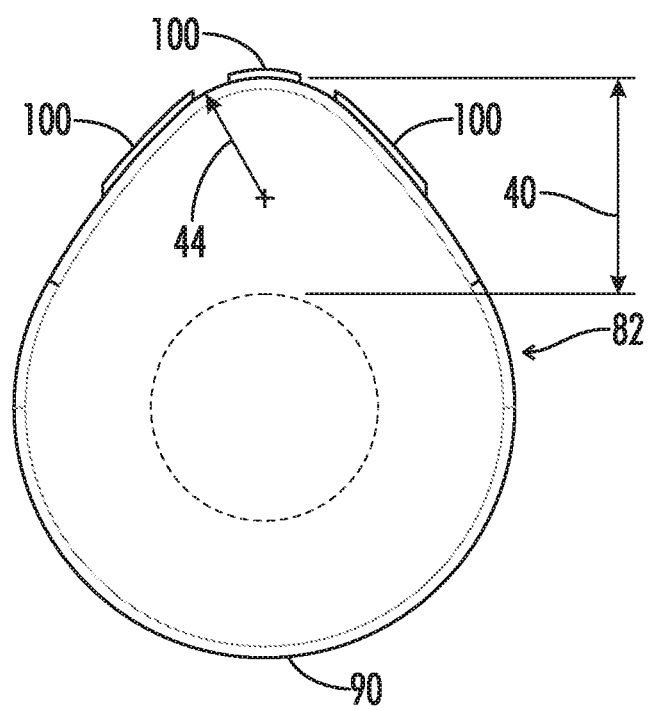
FIG. 31 illustrates a proximal elevation view of the grip of FIG. 28.
Figure 33:
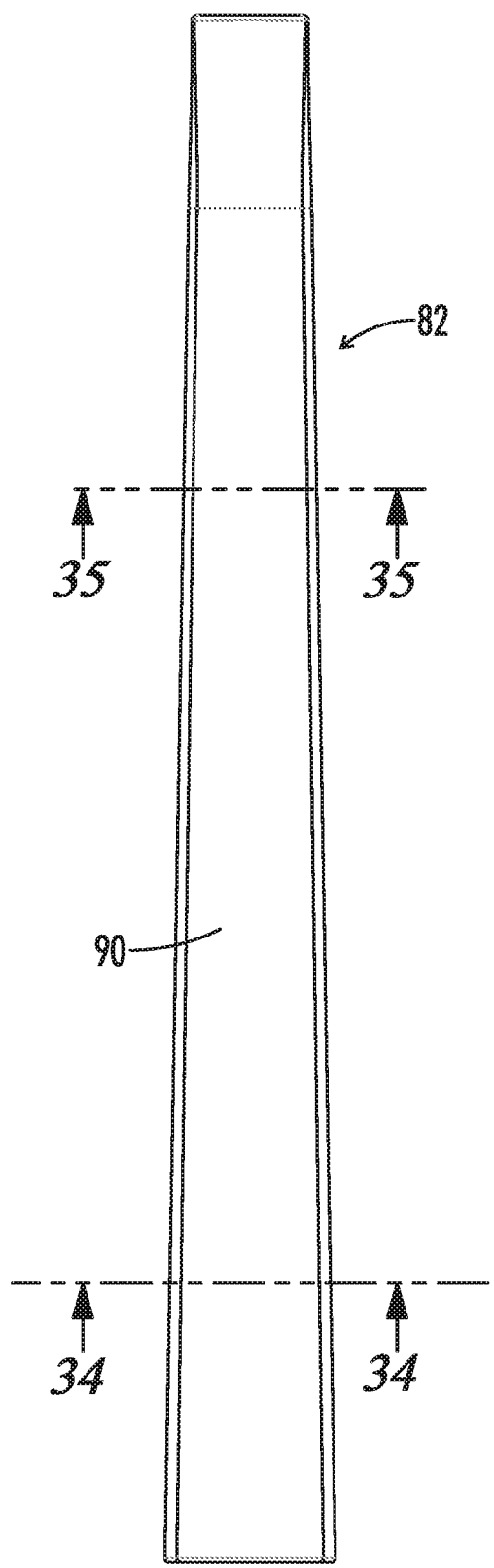
FIG. 33 illustrates a front elevation view of a hand positioning accessory in the form of a grip of another embodiment of the present invention.
Figure 35:
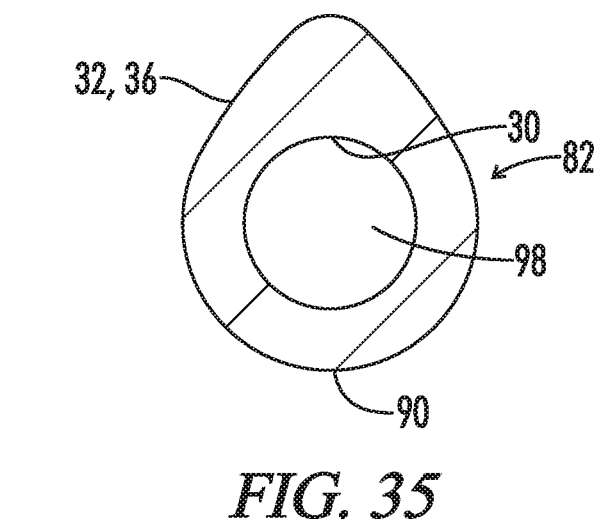
FIG. 35 illustrates a sectional view of the grip of FIG. 33 taken alone line 35-35 of FIG. 33.
Figure 34:
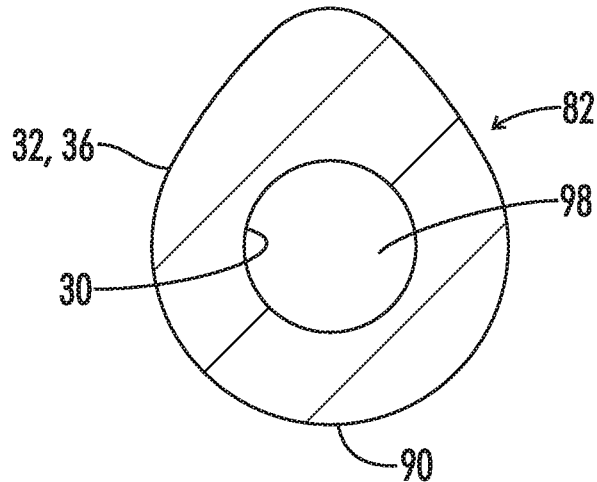
FIG. 34 illustrates a sectional view of the grip of FIG. 33 taken alone line 34-34 of FIG. 33.

In some embodiments, as shown in FIGS. 24-38, the sporting good is a golf club 48, the hand positioning accessory 10 forms a grip 82 of the golf club 48, the golf club 48 further comprises a golf club head 84 located at a distal end of the shaft 16. Optionally, as best seen in FIG. 24, the golf club head 84 comprises a plurality of grooves 86. Optionally, the golf club 48 is a wood (e.g., driver or fairway wood), an iron or a putter. Optionally, the grip 82 and shaft 16 each comprise a front side 88,90 and an underside 92,94 opposite the front side 88,90, the head 84 extends forwardly from the shaft distal end and the apex 38 is located on the underside of the grip 94, as is the case of the embodiments of FIGS. 24-38. Optionally, the grip 82 is generally in the shape of a tear-drop, as is the case of the embodiments of FIGS. 24-38. As shown in FIGS. 29-30, 32, and 34-36 for example, the golf grip 82 may include a channel 98 for receiving the shaft 16.

In still further embodiments, the present disclosure provides a method of adding a hand positioning accessory 10 to a bat 46. The method may include the steps of a) providing a bat 46 that may include a knob 50, a handle 54 located above the knob 50 and a barrel 52 located above the handle 54; b) providing a hand positioning accessory 10, the hand positioning accessory 10 optionally having a proximal end 18, a distal end 20, a length 22 extending from the proximal end 18 to the distal end 20, a left side 26, a right side 24, a width 28 extending from the left side 26 to the right side 24 and generally perpendicular to the length 22, an interior surface 30 configured to face the handle 54, an exterior surface 32 opposite the interior surface 30, configured to receive a plurality of fingers 34 of a human user and comprising a base 36 comprising an apex 38, and a thickness 40 extending from the interior surface 30 to the exterior surface 32 and generally perpendicular to the length 22 and width 28, wherein optionally, at least a portion of the base 36 is generally convex in shape and at least a portion of the interior surface 30 of the hand positioning accessory 10 is generally concave in shape, wherein optionally the hand positioning accessory 10 further comprises a recess/hollow interior 42 located interiorly relative to the interior surface 30 and extending from the left side 26 to the right side 24; c) placing the handle 54 in the recess/hollow interior 42 so that the interior surface 30 faces the handle 54; and d) directly or indirectly attaching the hand positioning accessory 10 to the handle 54. The hand positioning accessory 10 may have one or more of the features described herein. Preferably, after step c), the cross-sectional profile of the bat handle 54 with the hand positioning accessory 10 is generally ovular in shape, as best seen in FIGS. 6-7, 20-21, 30, 31, 32, 34-36, and 37, due to the fact that, in FIGS. 6-7, and 20-21, the hand positioning accessory 10 only wraps partially around the bat handle 54, and due to the fact in FIGS.

31, 32, 34-36, and 37, the apex 38 protrudes away from the shaft 16 to a greater extent than the underside 92. In other words, the hand positioning accessory 10 may create an ovular-shaped handle region 12 for better performance. Relatedly, in FIG. 41, an embodiment of a hand positioning accessory 10 in which the hand positioning accessory 10 is incorporated as part of a bat handle 54, the cross-sectional profile of the bat handle 54 is also ovular in shape. Relatedly, it will be appreciated from viewing the side cross-sectional view of FIG. 50 that, in the embodiment of FIGS. 42-50, the cross-sectional profile of the bat handle 54 with the hand positioning accessory 10 is also generally ovular in shape due to the fact that the apex 38 protrudes away from the bat handle 54 to a greater extent than the side opposite the apex 38. In other words, for the embodiments of FIGS. 1-51, the thickness 40 of the hand positioning accessory 10 is greatest at the apex 38.

FIGS. 39-41 illustrate a fourth embodiment of a hand positioning accessory 10 in which the hand positioning accessory 10 is incorporated as part of a bat handle 54. In such embodiment, the hand positioning accessory 10 may include any of the features, including dimensions of the above embodiment. For example, a typical bat handle 54 may have a diameter of from about 0.7 inches to about 1 inch (e.g., about 0.8 inches). Such handles 54 are typically cylindrical. Thus, an imaginary line 112 has been drawn in FIG. 41 showing where the handle 54 would end if it had a circular cross-section. Consistent with prior embodiments, in the embodiment of FIGS. 39-41, the distance 114 from the apex 38 (excluding any narrowly profiled regions of the apex 38 such as the proximal and distal tapered regions 72 and 76) to the imaginary line 112 is preferably from about 0.1 inches to about 0.5 inches. Put another way, the distance 118 between the center 116 of the imaginary circle to the apex 38 excluding any narrowly profiled regions of the apex 38) is preferably 12 of the normal bat handle diameter 111 (0.35 to about 0.5 inches) plus the distance 114 from the apex 38 (excluding any narrowly profiled regions of the apex 38) to the imaginary line 112 (0.1 inches to about 0.5 inches), i.e., 0.45 inches to about 1 inch.

Optionally, the distance 110 from the apex 38 (excluding any narrowly profiled regions of the apex 38) to the knob 50 is between about 0.5 inches to about 2.5 inches, as shown in FIGS. 39-40. Optionally, the hand positioning accessory 10 comprises a proximal tapered region 72 as well as distal tapered region 76 as previously described. Optionally, a user places a pinky finger 74 over the proximal tapered region 72. Optionally, the hand positioning accessory 10 is covered by grip wrap/grip tape 56, and the grip wrap/grip tape 56 is positioned between the user's fingers 34 and the hand positioning accessory 10. Optionally, the apex 38 extends longitudinally generally parallel to the length 22 for a distance of at least 5 inches. Optionally, the proximal end 18 is curved. Optionally, the bat 46 is a metal or wooden bat, which is preferably approved for use in competition. The hand positioning accessory 10 may have one or more of the features described herein.

| Part List | |
|---|---|
| hand positioning accessory | 10 |
| handle region | 12 |
| human hand | 14 |
| shaft | 16 |
| hand positioning accessory proximal end | 18 |
| hand positioning accessory distal end | 20 |

-continued

| Part List | |
|---|---|
| hand positioning accessory length | 22 |
| hand positioning accessory right side | 24 |
| hand positioning accessory left side | 26 |
| hand positioning accessory width | 28 |
| hand positioning accessory interior surface | 30 |
| hand positioning accessory exterior surface | 32 |
| human fingers | 34 |
| base | 36 |
| apex | 38 |
| thickness | 40 |
| recess/hollow interior | 42 |
| radius of curvature | 44 |
| bat | 46 |
| golf club | 48 |
| bat knob | 50 |
| bat barrel | 52 |
| bat handle | 54 |
| grip wrap/grip tape | 56 |
| soft core | 58 |
| covering | 60 |
| longitudinal slots | 62 |
| ribs/protrusions | 64 |
| proximal group of slots | 66 |
| distal group of slots | 68 |
| degree to which protrusions extend above slots | 70 |
| proximal tapered region | 72 |
| pinky | 74 |
| distal tapered region | 76 |
| proximal end radius of curvature | 78 |
| tab | 80 |
| golf club grip | 82 |
| golf club head | 84 |
| golf club head grooves | 86 |
| front side of shaft | 88 |
| front side of grip | 90 |
| rear side/underside of shaft | 92 |
| rear side/underside of grip | 94 |
| center of width | 96 |
| channel of golf club grip for receiving shaft | 98 |
| Golf club ribs/protrusions | 100 |
| integral ribs/protrusions | 102 |
| recesses created by protrusions | 104 |
| Side tab | 106 |
| Tab slot | 108 |
| Distance from apex to knob | 110 |
| Handle diameter | 111 |
| Imaginary Line | 112 |
| Distance between imaginary line and apex | 114 |
| Center | 116 |
| Distance from center to apex | 118 |
| Proximal section | 120 |
| Distal section | 122 |
| Bicycle | 124 |
| Grooves | 126 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, the steps of the methods described herein can be performed in any suitable order, including simultaneously.

What is claimed is:

1. A method of adding a hand positioning accessory to a bat comprising:
   a) providing a bat comprising a knob, a handle located distal to the knob and a barrel located distal to the handle;
   b) providing a hand positioning accessory comprising a proximal end, a distal end, a length extending from the proximal end to the distal end, a width generally perpendicular to the length, an interior surface configured to face the handle, an exterior surface opposite the interior surface, configured to receive a plurality of fingers of a human user and comprising a base comprising an apex, and a thickness extending from the interior surface to the exterior surface and generally perpendicular to the length and width, wherein at least a portion of the base is generally convex in shape, wherein at least a portion of the interior surface of the hand positioning accessory is generally concave in shape, wherein the hand positioning accessory further comprises an interior located interiorly relative to the interior surface,
   wherein the apex is curved and the apex has a radius of curvature of between about 0.15 inches to about 0.4 inches excluding any narrowly profiled regions of the apex, wherein the interior is configured to receive a handle having a diameter of between about 0.5 inches and about 1.5 inches, and further wherein the thickness of the hand positioning accessory at the apex, as measured from the interior surface to the apex is between about 0.1 inches to about 0.5 inches excluding any narrowly profiled regions of the apex; and
   c) positioning the handle of the bat in the interior of the hand positioning accessory so that the interior surface faces the handle and the proximal end of the hand positioning accessory is adjacent to the knob,
   wherein after step c), the cross-sectional profile of the handle with the hand positioning accessory is generally ovular in shape,
   wherein, excluding any narrowly profiled regions of the apex, the thickness of the hand positioning accessory is greatest at the apex,
   wherein the exterior surface of the hand positioning accessory further comprises a proximal group of a plurality of longitudinal ribs and a distal group of a plurality of longitudinal ribs, each longitudinal rib extending generally parallel to the hand positioning accessory length, and
   further wherein the hand positioning accessory is comprised of a core configured to absorb vibration from the handle and a covering partially covering the core and having a hardness greater than the core, the covering forming the base, and further wherein the core forms the longitudinal ribs.

2. The method of claim 1 wherein each longitudinal rib in the proximal group is aligned widthwise with a longitudinal rib in the distal group.

3. The method of claim 1 wherein the proximal group of longitudinal ribs and the distal group of longitudinal ribs each comprise a middle longitudinal protrusion aligned widthwise with the apex.

4. The method of claim 1 wherein the core comprises a tab, wherein the covering comprises a channel leading to the interior, and further wherein the tab is located in the channel.

5. The method of claim 4 wherein the hand positioning accessory comprises a left side and a right side, wherein the channel is located on at least one of the left side or the right side of the hand positioning accessory between the proximal end and the distal end.

6. The method of claim 1 wherein the covering comprises a proximal group of a plurality of longitudinal slots and a distal group of a plurality of longitudinal slots and further wherein each longitudinal rib protrudes through a longitudinal slot beyond the base to form a portion of the exterior surface.

7. The method of claim 6 wherein each longitudinal rib of the core protrude through a longitudinal slot a distance of from about 0.05 inches to about 0.25 inches.

8. The method of claim 1 wherein the hand positioning accessory further comprises a plurality of grooves located opposite the apex and the longitudinal protrusions, and further wherein the plurality of grooves are aligned with the hand positioning accessory width.

9. The method of claim 1 wherein the core has a hardness of from about 30 to about 70 (Shore A) and the covering has a hardness of from about 70 to about 125 (Shore A).

10. The method of claim 9 wherein the core and covering each form a portion of the interior surface and the exterior surface.

11. The method of claim 9 wherein the covering comprises a plurality of longitudinal slots and further wherein the plurality of longitudinal ribs protrude through the longitudinal slots beyond the base to form a portion of the exterior surface.

12. The method of claim 11 wherein the plurality of longitudinal slots comprises a proximal group of three longitudinal slots and a distal group of three longitudinal slots.

13. The method of claim 12 wherein each longitudinal rib in the proximal group is aligned longitudinally along the hand positioning accessory length and each longitudinal rib in the distal group is aligned longitudinally along the hand positioning accessory length and further wherein each longitudinal rib in the proximal group is aligned widthwise with a longitudinal rib in the distal group.

14. The method of claim 11 wherein the proximal group of three longitudinal ribs and the distal group of three longitudinal ribs each comprise a middle longitudinal protrusion aligned widthwise with the apex.

15. The method of claim 11 wherein the method further comprises placing pads of a plurality of a human user's fingers over portions of the longitudinal ribs protruding through the longitudinal slots.

16. The method of claim 11 wherein the longitudinal ribs protrude through the longitudinal slots a distance from about 0.05 inches to about 0.25 inches.

17. The method of claim 11 wherein at least some of the longitudinal slots are generally rectangular in shape.

18. The method of claim 1 wherein, after step d), the hand positioning accessory comprises a proximal tapered region adjacent to the proximal end in which the thickness increases distally.

19. The method of claim 18 further comprising placing a pinky finger of a human user over the proximal tapered region.

20. The method of claim 1 wherein the method further comprises wrapping a grip wrap over the exterior surface to attach the handle gripping accessory to the handle.

21. The method of claim 1 wherein the hand positioning accessory of step b) is comprised of a proximal section and a distal section, wherein the proximal and distal sections are not attached prior to step c), and further wherein the proximal and distal sections are comprised of an elastomeric material.

22. The method of claim 1 further comprising a tab extending distally from the distal end of the hand positioning accessory.

23. The method of claim 1, wherein the barrel, handle and knob are each generally cylindrical in shape and have a diameter and further wherein the barrel and knob each have a greater diameter than the handle diameter and further wherein and the handle has a diameter of between about 0.7 inches and about 1 inch.

24. The method of claim 1 wherein the interior is configured to receive a handle having a diameter of between about 0.7 inches and about 1 inch.

\* \* \* \* \*